United States Patent [19]
Baker et al.

[11] Patent Number: 5,927,455
[45] Date of Patent: Jul. 27, 1999

[54] OVERRUNNING PAWL CLUTCH

[75] Inventors: Evan R. Baker, Camas, Wash.;
Thomas F. Dunlap, West Linn;
Christopher J. Walter, Portland, both of Oreg.

[73] Assignee: Warn Industries, Milwaukie, Oreg.

[21] Appl. No.: 08/897,355

[22] Filed: Jul. 21, 1997

[51] Int. Cl.⁶ .................................................. F16D 41/08
[52] U.S. Cl. .............................. 192/36; 192/43.1; 192/46
[58] Field of Search .............................. 192/43.1, 45.1, 192/46, 47, 71, 35, 36

[56] References Cited

U.S. PATENT DOCUMENTS

| | | | |
|---|---|---|---|
| 2,137,643 | 11/1938 | Cirac et al. | 74/576 |
| 2,744,432 | 5/1956 | Rueb | 192/43.1 X |
| 2,867,144 | 1/1959 | Stevens | 192/43.1 X |
| 3,055,471 | 9/1962 | Warn et al. | 192/35 X |
| 3,314,510 | 4/1967 | Zlotek | |
| 4,076,108 | 2/1978 | Fogelberg | 192/35 |

*Primary Examiner*—Richard M. Lorence
*Attorney, Agent, or Firm*—Robert L. Harrington

[57] ABSTRACT

A bi-directional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

54 Claims, 18 Drawing Sheets

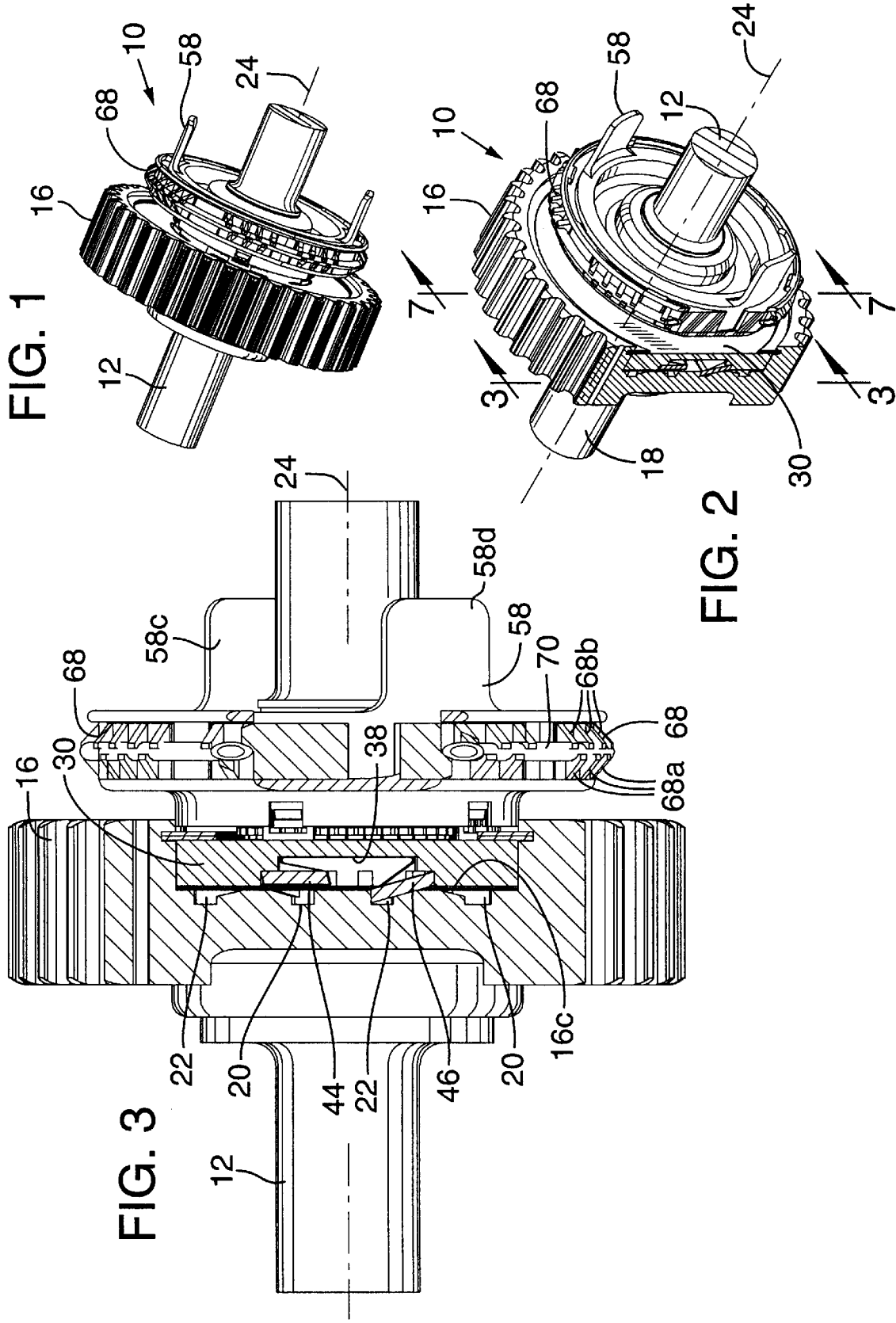

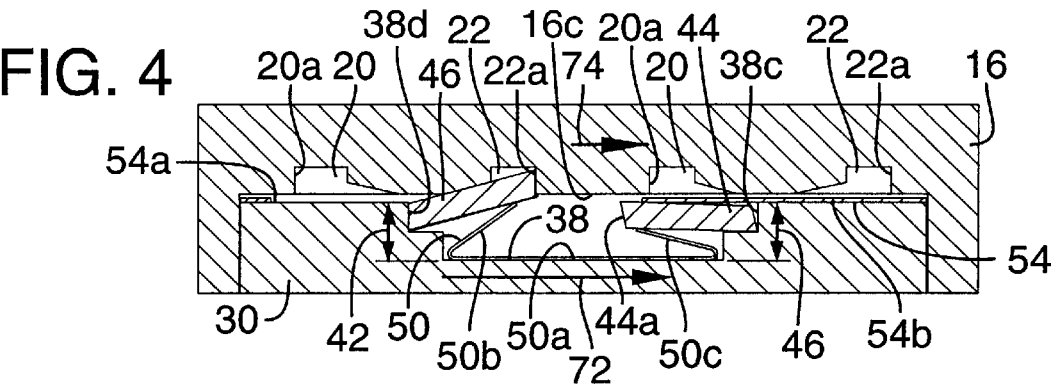
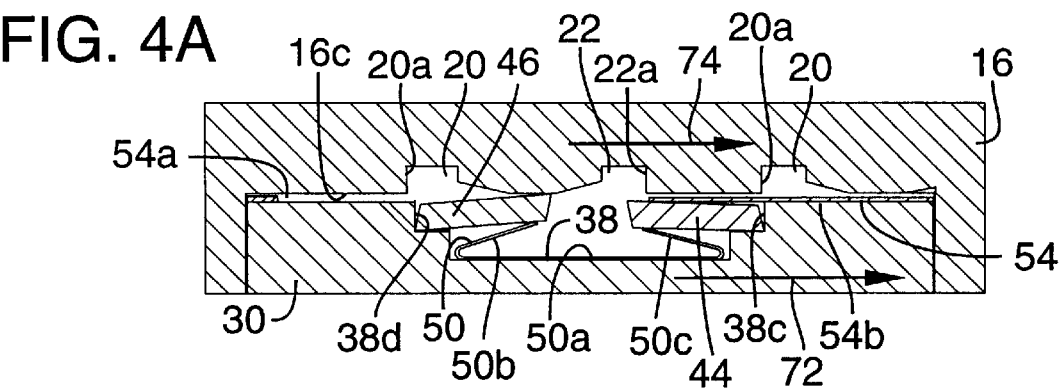
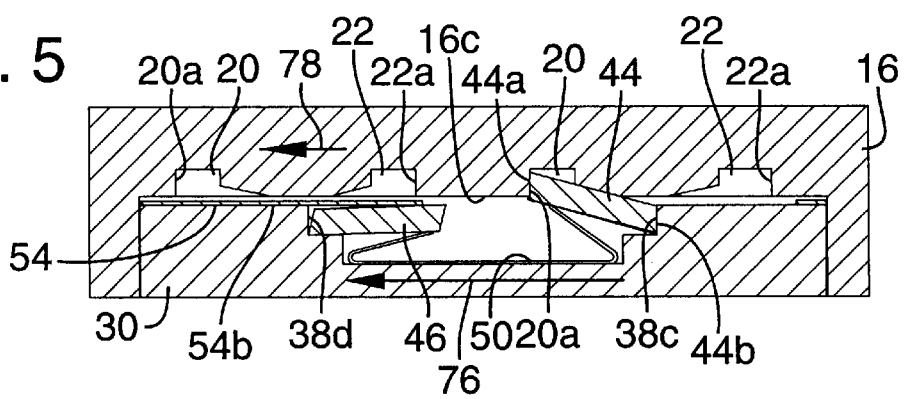
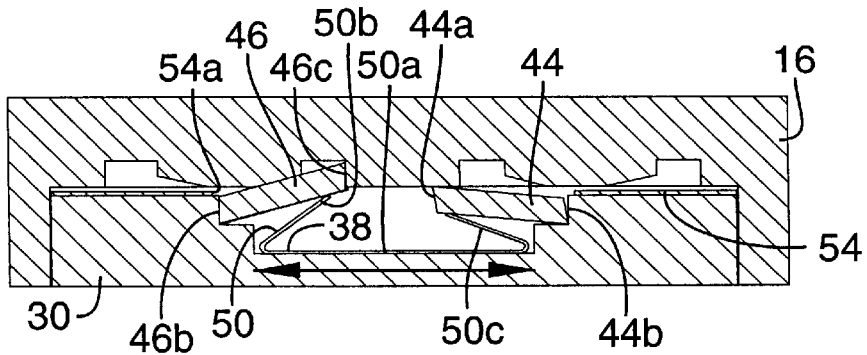

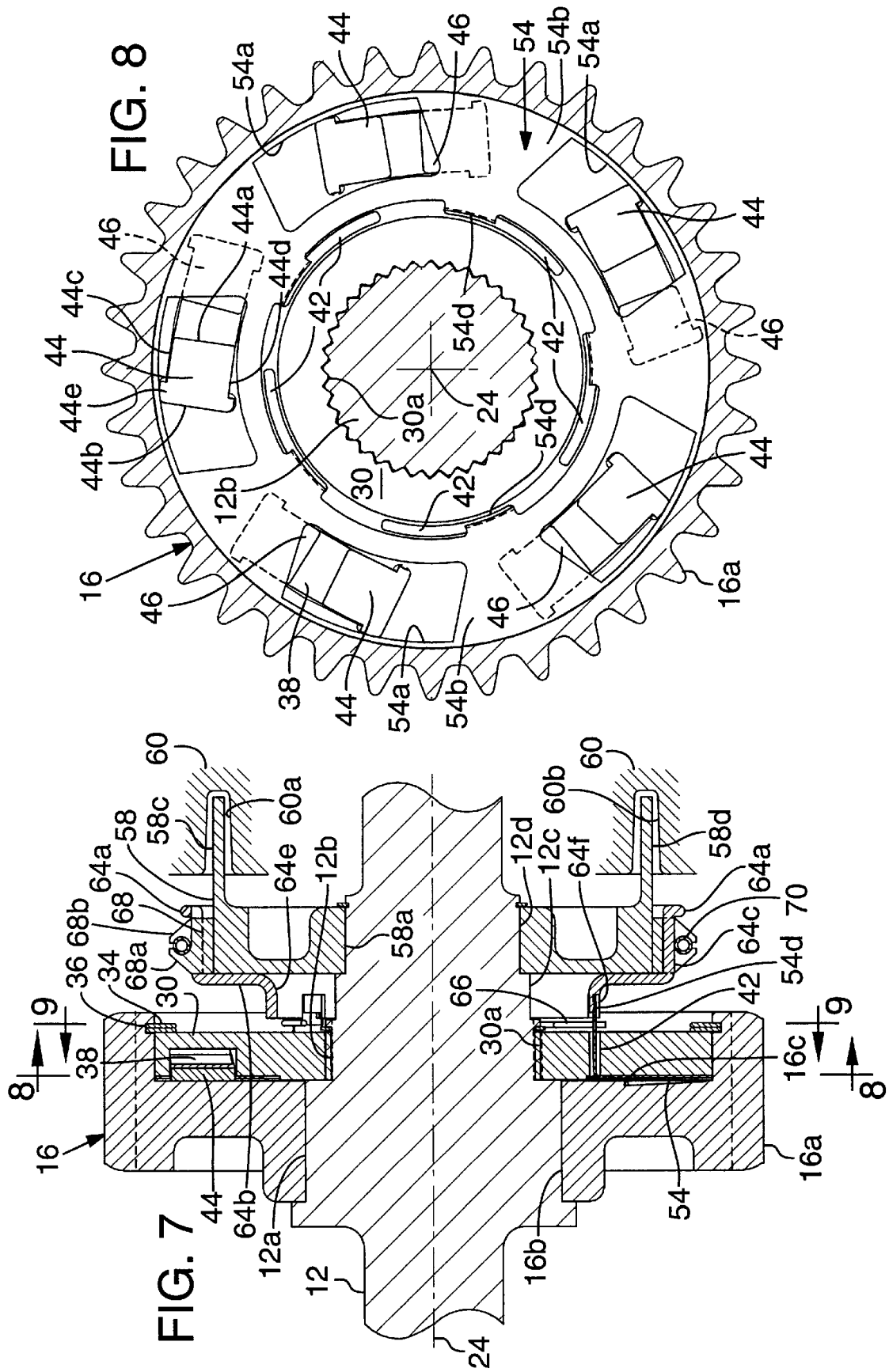

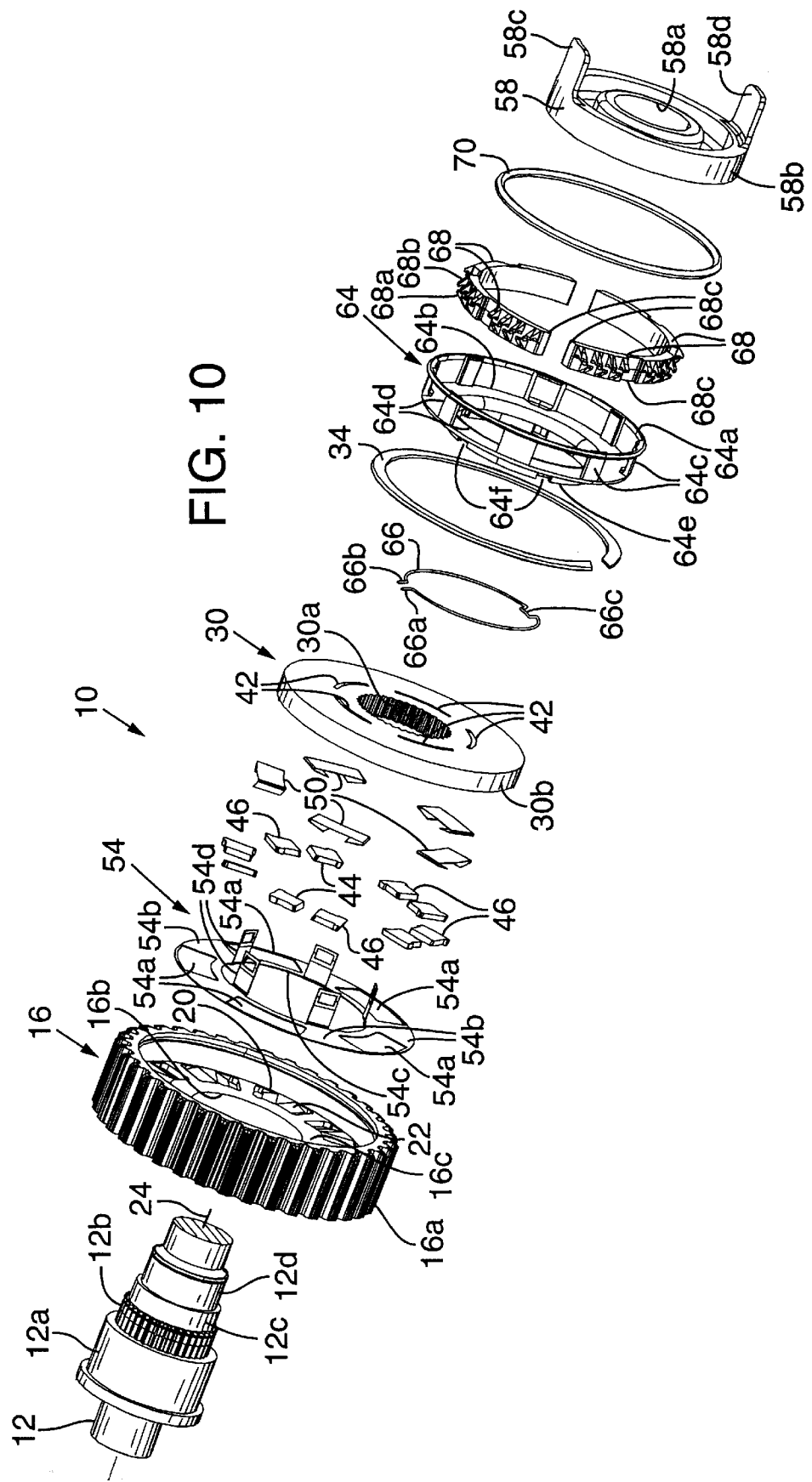

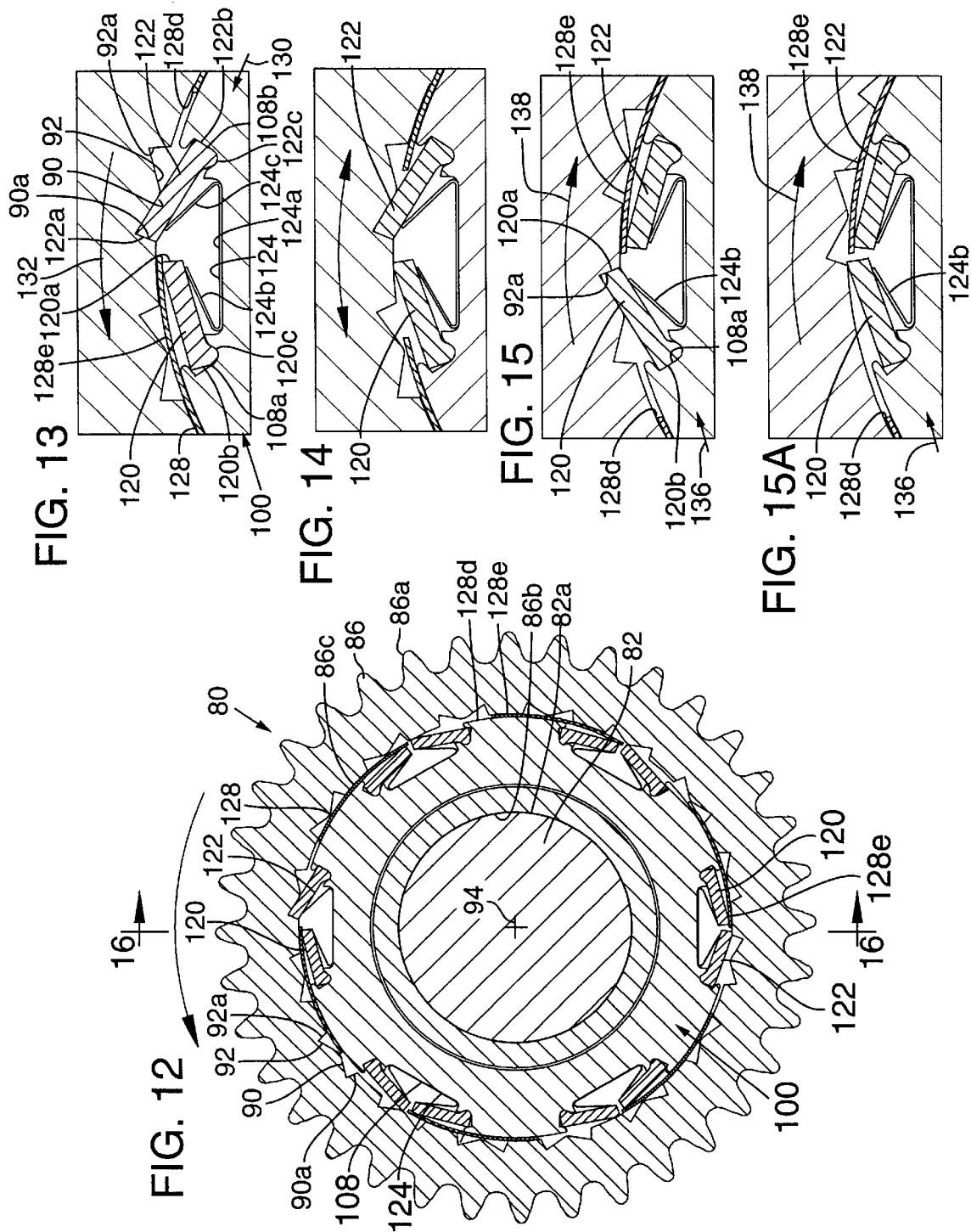

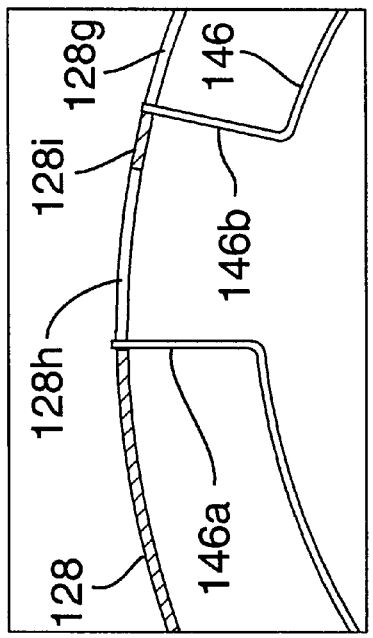
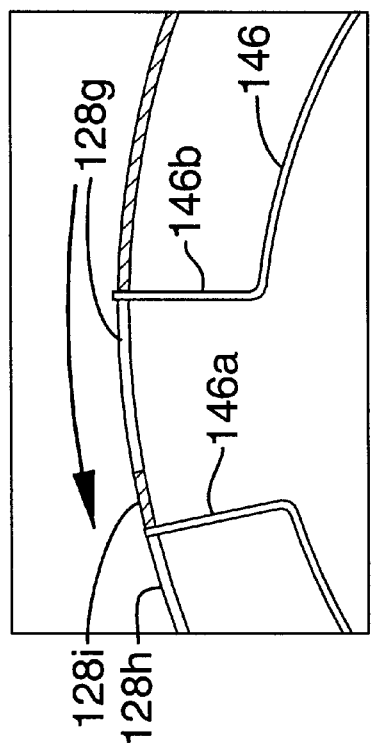
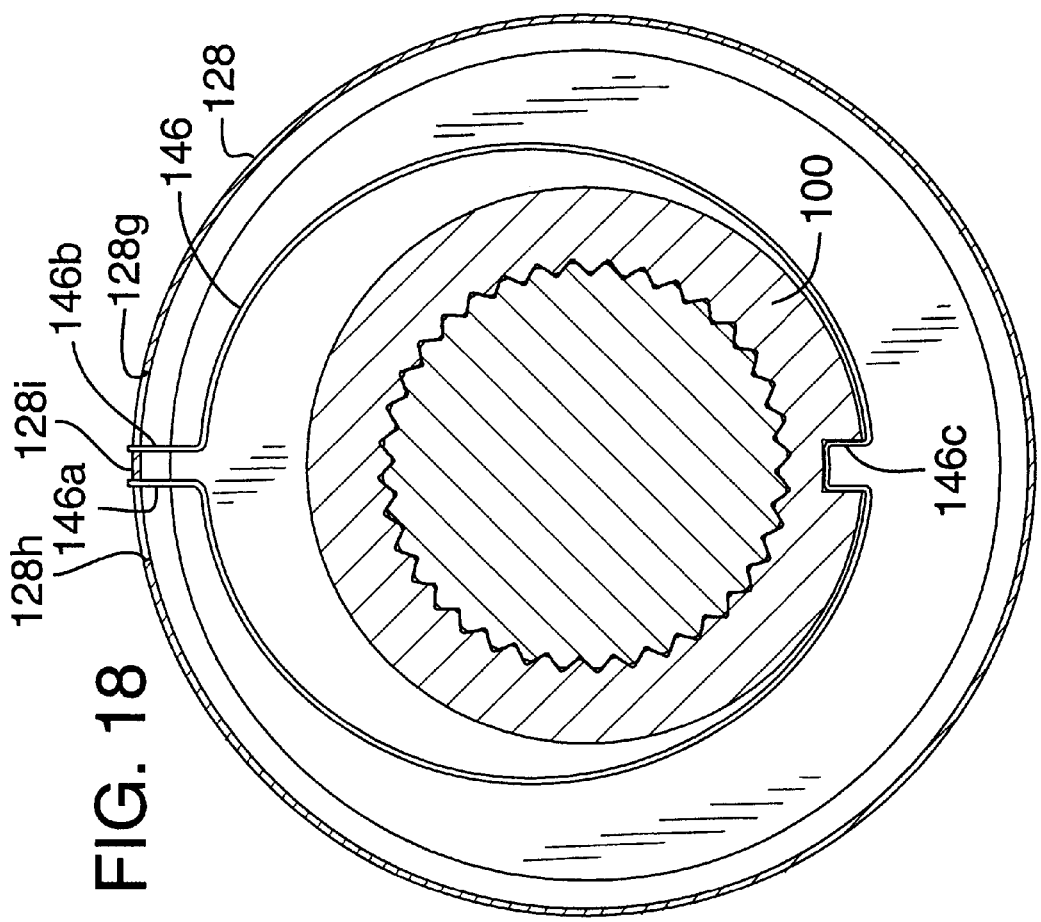

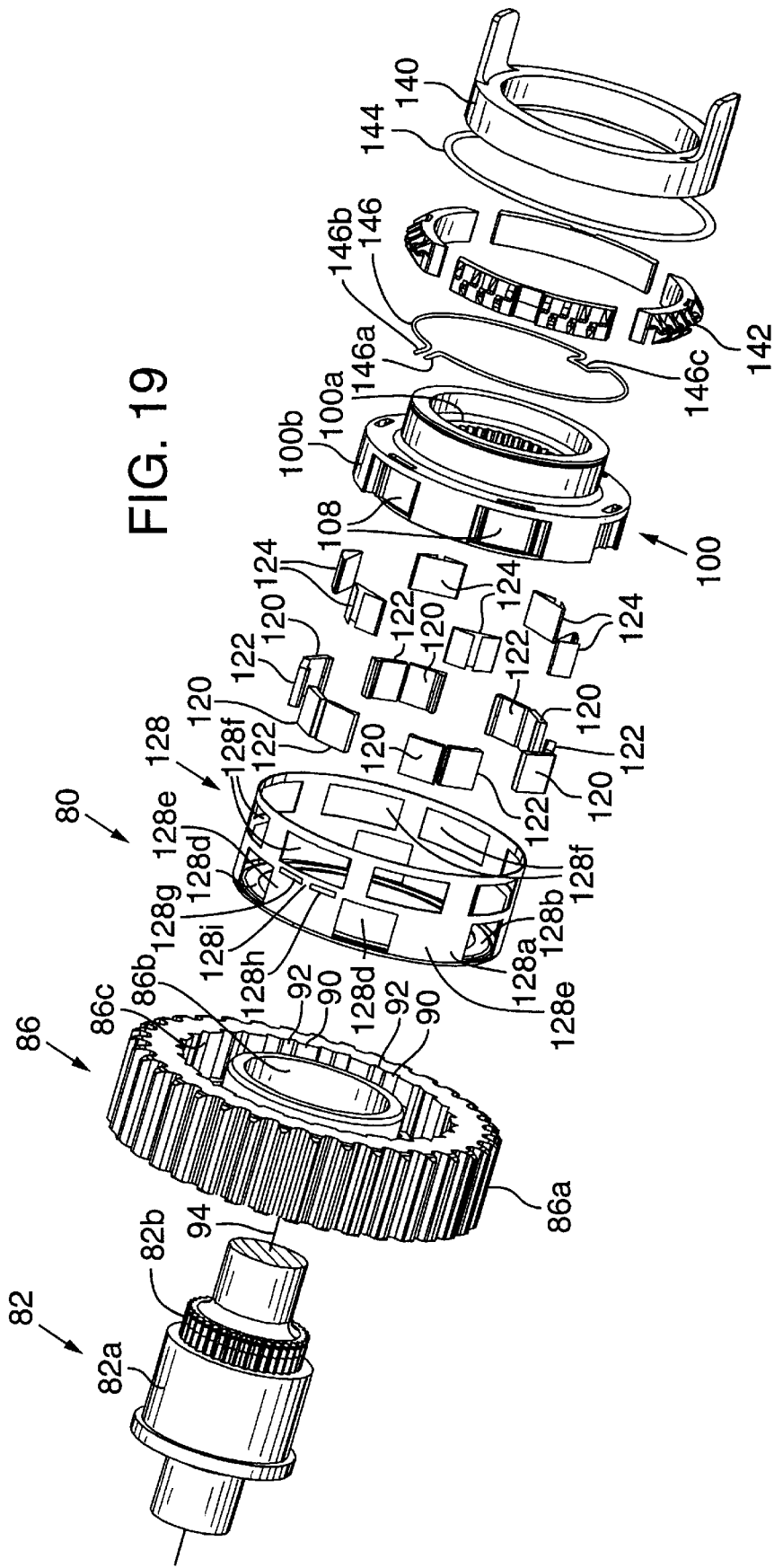

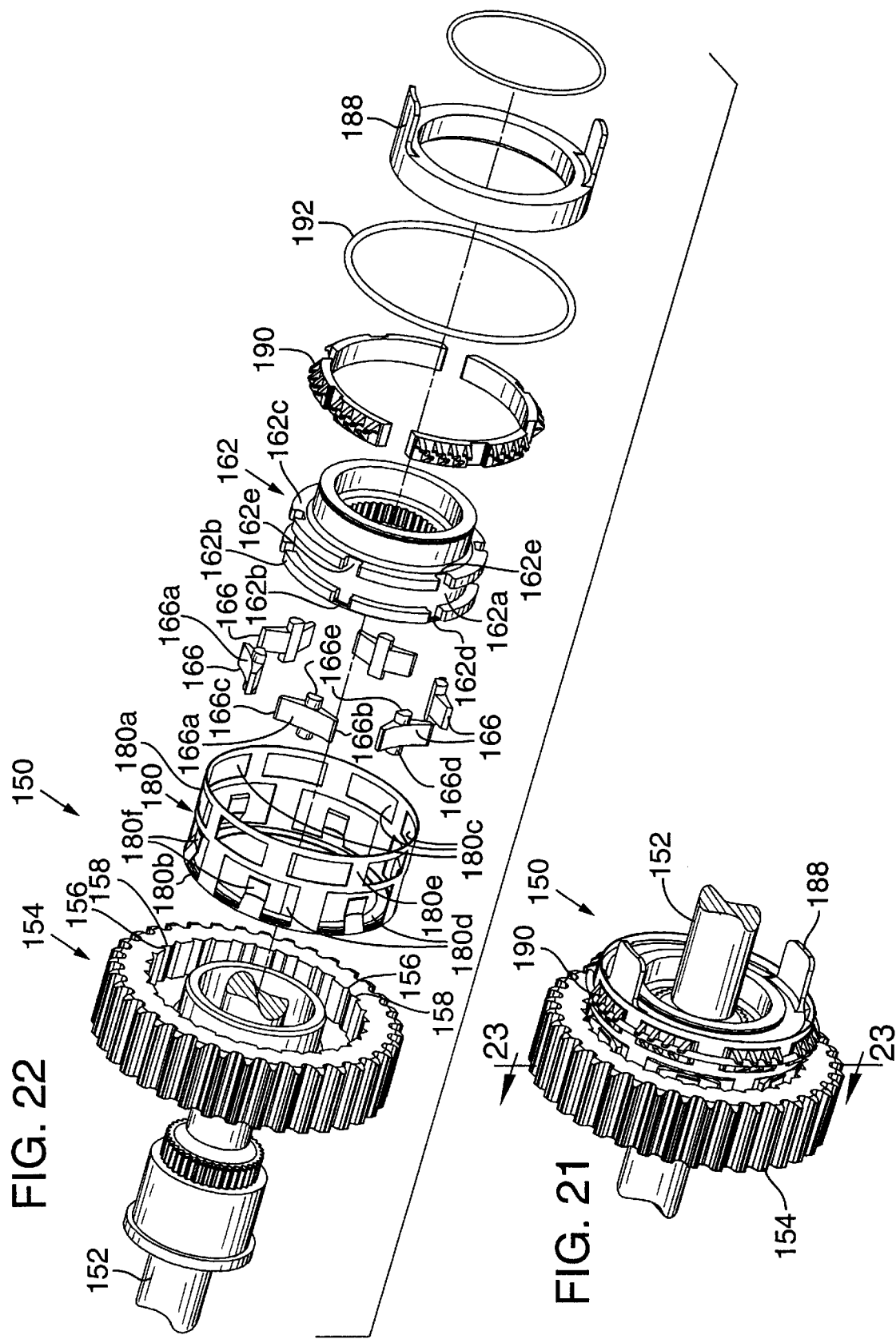

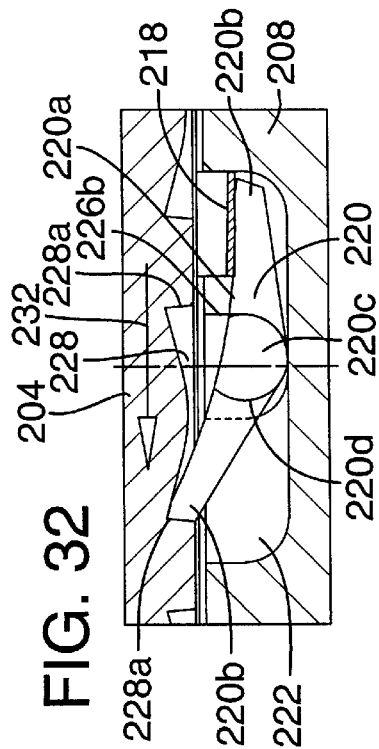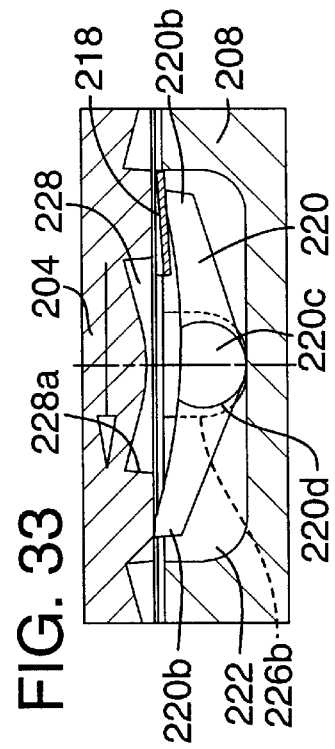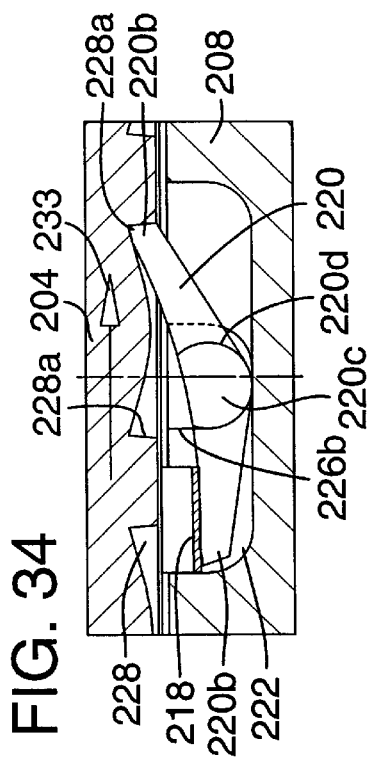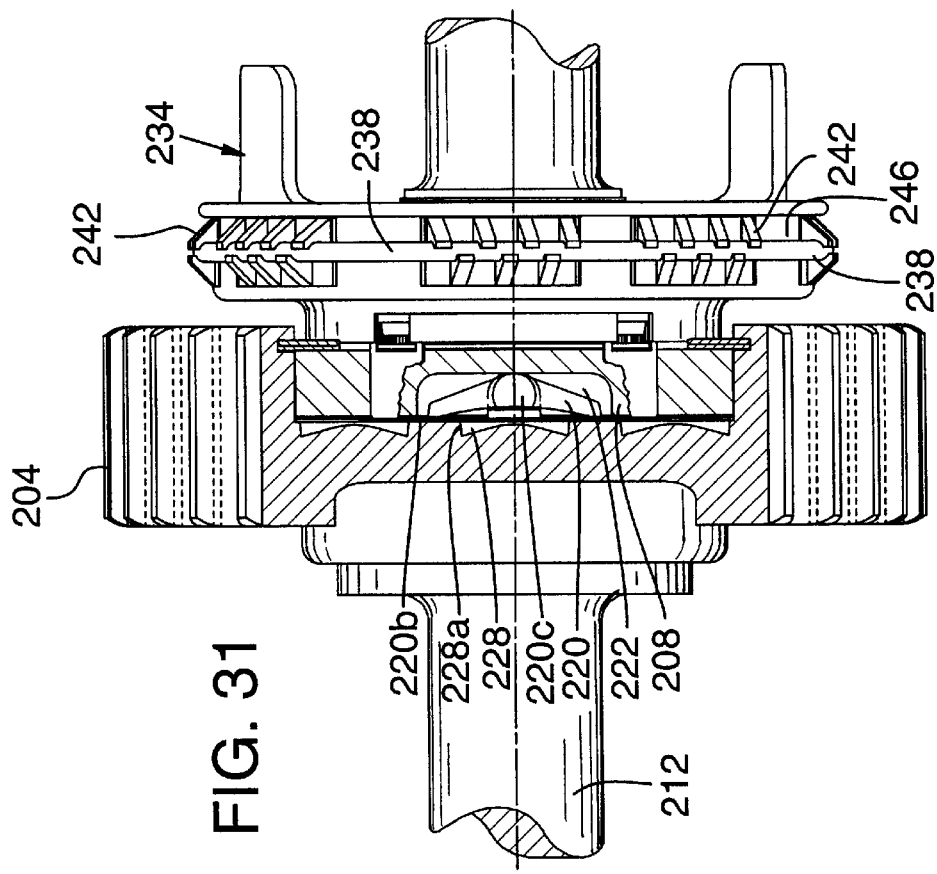

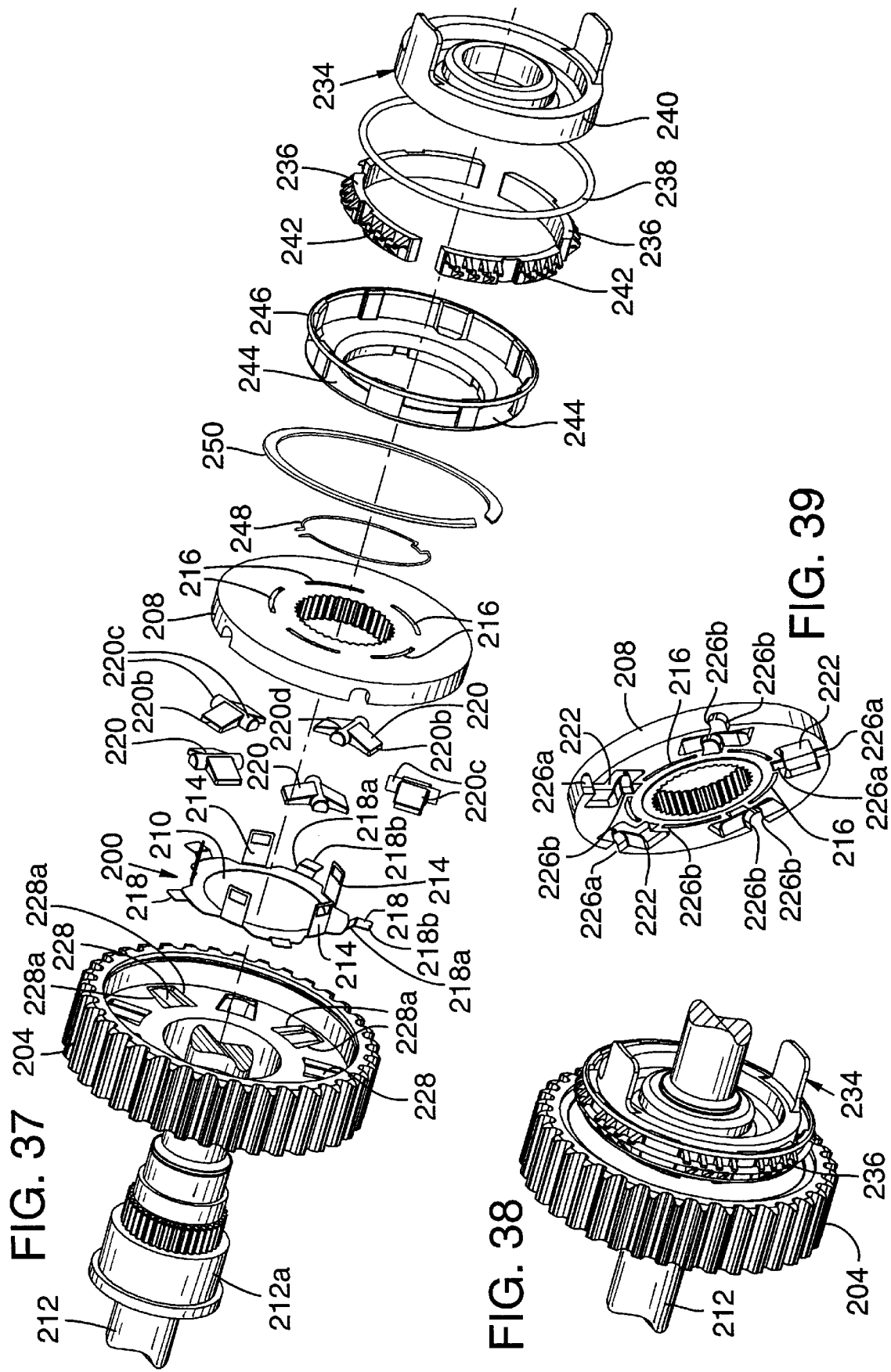

OVERRUNNING PAWL CLUTCH

This invention relates to clutches, and more particularly to a pawl-type clutch having control mechanism for multiple modes of operation.

Pawl-type clutches generally have driving and driven members mounted adjacent each other with notches therein which receive pawls extending between the notches to transmit driving torque between the driving and driven members. It is known to have such pawl-type clutches wherein the pawls are biased toward their engaging positions and are urged to non-engaging positions when the driven member overruns the driving member. Where such clutches have been one-way acting only they generally have been able to be relatively simple in structure.

However, where others have attempted to produce pawl-type clutches with multiple modes of operation, such prior devices have required rather complex control, or operating, mechanism to provide two-way pawl actuation and disengagement for overrunning. The complexities of such have made prior bi-directional overrunning pawl-type clutches heavy, expensive, bulky, and often prone to problems in operation.

SUMMARY OF THE INVENTION

Briefly, the present invention may be described as an overrunning pawl type clutch having pawls which are positioned to extend between shoulders on adjacent rotating members to transmit torque therebetween, with the driven member when overrunning the driving member operable to urge the pawls out of engagement. The clutch includes a control element interposed between and shiftable relative to the driving and driven members, operable in a first position to hold a pawl in a non-engaged position, and when shifted to a second position to permit the pawl to extend into an operating position to transmit torque between the driving and driven members.

In one embodiment of the invention an object is to provide oppositely directed pawls and a control member intermediate between the driving and driven members which is shiftable between first and second control positions. In the first position the control element holds a first one of the pawls in its non-engaged position, but allows a second pawl facing in the opposite direction to move to its engaging torque-transmitting position, thus providing overrunning torque transmission in a first direction. Further, the control element, or member, when in a second position holds the second pawl in its non-engaging position and permits the first pawl to extend to its engaging position to transmit torque between the driving and driven members in the opposite direction. The structure of such device provides a simple and effective operating device which may be compactly and inexpensively constructed to provide reliable two-way overrunning pawl-type clutch mechanism.

A further object of the invention is to provide a two way overrunning pawl-type clutch with a control member interposed between the driving and driven members, as previously discussed, for providing two way overrunning pawl-type operations dependent upon the position of the control member, and further providing the control member with an operative third position in which the oppositely directed pawls are allowed to extend concurrently into their engaging positions to prevent overrunning in either direction, thus to provide lock-up of the clutch.

Yet another object of the invention is to provide a two-way overrunning pawl-type clutch with a control member interposed between the driving and driven members for providing two-way overrunning pawl-type operations depending upon the positions of the control member, and further providing the control member with another position in which the oppositely directed pawls are held concurrently in their non-engaging positions to allow free-wheeling action between the driving and driven members.

Such a unique clutch may have particular application in vehicles where selectable four wheel drive capabilities are desirable.

In one embodiment of the invention pawls are carried on a driving member with one end of a pawl engaging a shoulder on the driving member and yieldable biasing means urging the opposite end portion outwardly toward the shoulder on the opposed driven member. The control member is interposed between the driving and driven members and is a plate-like element which is shiftable therebetween. Such structure provides a compact, inexpensive, and reliable construction for a pawl-type overrunning clutch.

More specifically, an object of the present invention is to provide a novel pawl-type overrunning clutch in which the control member is substantially automatically actuated through frictional engagement with a grounding member, such that retardation of initial rotation of the control member relative to the driving member will shift the control member to an appropriate position for driving/overrunning operation.

These and other objects and advantages and features of the present invention will become apparent to one skilled in the art upon reading the following description and claims taken in conjunction with the following drawings.

BRIEF DESCRIPTION OF THE DRAWINGS

FIG. 1 is a isometric view of a clutch constructed according to an embodiment of the invention.

FIG. 2 is another isometric view of the clutch according to the invention with a minor side segment removed to illustrate certain internal portions of the device;

FIG. 3 is an enlarged side elevation view taken generally along the line 3—3 in FIG. 2;

FIG. 4 is an enlarged view of the cut portion of FIG. 3 rotated 90 degrees clockwise to illustrate a driving interconnection between parts in the device;

FIG. 4A is a view similar to FIG. 4 with the device in a overrunning condition;

FIG. 5 is a view similar to FIG. 4 in a second operational driving mode;

FIG. 6 is a view similar to FIG. 4 with the device in a third operating mode;

FIG. 7 is an enlarged view taken generally along the line 7—7 in FIG. 2;

FIG. 8 is a view taken generally along the line 8—8 in FIG. 7;

FIG. 10 is an exploded isometric view of the device with the parts separated for illustrative purposes;

FIG. 12 is a cross sectional view of a second embodiment of the invention having radially actuated pawls;

FIGS. 13–15A are enlarged views of a set of pawls and control member of the FIG. 12 embodiment in various operating conditions;

FIG. 18 is an enlarged view taken generally along the line 18—18 in FIG. 16 illustrating a control member with a centering spring holding the control member in a centered position;

FIG. 18A is an enlarged portion of FIG. 18 illustrating the control member shifted to a first operating position against the urging of the centering spring;

FIG. 18B is another enlarged view of a portion of 18 illustrating the control member shifted to a second operating position against the urging of the centering spring;

FIG. 19 is an exploded isometric view of the disassembled parts of the clutch of the second embodiment of the invention;

FIG. 21 is an isometric view of a third embodiment of the invention;

FIG. 22 is an exploded isometric view of the parts of the clutch illustrated in FIG. 21;

FIG. 31 is an enlarged side elevation view of a clutch constructed according to another embodiment of the invention.

FIGS. 32–34 are enlarged views of different operating conditions of engaging and control parts of the embodiment of the invention shown in FIG. 31.

FIG. 37 is an exploded isometric view of the parts of the clutch illustrated in FIG. 31.

FIG. 38 is an isometric view of the embodiment of the invention shown in FIG. 31.

FIG. 39 is a reverse isometric view of a driving member removed from FIG. 37.

DETAILED DESCRIPTION OF PREFERRED EMBODIMENTS OF THE INVENTION

Figure 9:
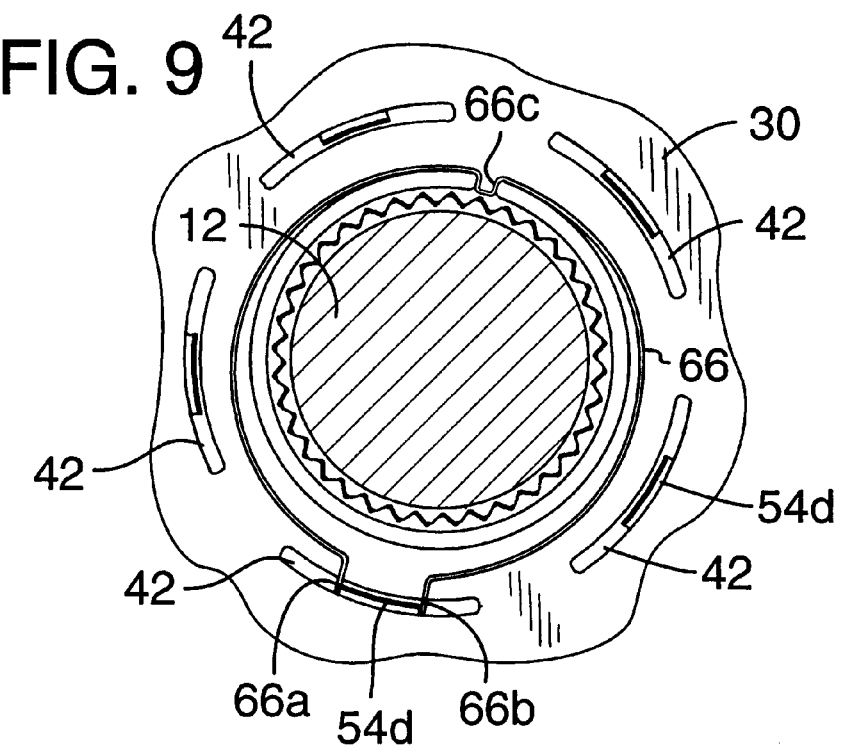
FIG. 9 is a cross sectional view taken along the line 9—9 in FIG. 7 illustrating a centering spring device.

Referring to FIG. 1, at 10 is indicated generally a clutch constructed according to an embodiment of the present invention. The clutch includes a drive shaft 12 adapted to be driven under power, and a driven member 16, which may be a gear, sprocket, or other form of torque, transmitter, journaled for rotation on shaft 12 which can be operatively coupled for rotation with shaft 12 through mechanism to be described below.

Referring to FIG. 10, the various component parts of the clutch 10 now will be described.

Drive shaft 12 has a first journal portion, or section, 12a which rotatably receives driven member, or sprocket, 16. A spline portion, or section, 12b is formed adjacent section 12a, and two stepped-down diameter portions 12c, 12d are positioned on the opposite side of spline section 12b from section 12a. The longitudinal axis of the drive shaft forms the axis of rotation 24 for the clutch.

Referring to FIGS. 7 and 10, driven member, or sprocket, 16 has external teeth 16a on which a drive chain may be mounted to transmit driving force to other devices. An internal bore 16b is of a size to run freely on section 12a of the drive shaft. A radially extending annular inset face 16c of sprocket 16 has a plurality of notches 20, 22 formed thereabout. These notches have the general configurations illustrated in FIGS. 3–6 with pawl-engaging shoulders 20a, 22a respectively. The notches and their respective shoulders also are referred to herein as pawl-receiving portions on the driven member 16. Notches 20, 22 and their respective shoulders 20a, 22a are arrayed about inset surface 16c which is disposed substantially normal, or perpendicular, to axis 24 for the drive shaft and clutch generally.

The portions of inset face 16c intermediate notches 20, 22 are disposed in a substantially common plane extending normal to axis 24 as is best seen in FIGS. 4–7 and 10.

A substantially disc shaped driving member 30 has a splined internal bore 30a which mounts in spline-connected driving position on splined portion 12b of the drive shaft. The outer peripheral edge 30b has a diameter small enough to allow the driving member to rotate with shaft 12 within, and independently of, driven member 16. As is best seen in FIGS. 3 and 7 drive member 30 fits within the inset portion 16c of driven member 16 and an annular spring clip 34 received in an annular groove 36 on the interior of driven member 16 holds the driving member 30 rotatably within the driven member.

Figure 11:
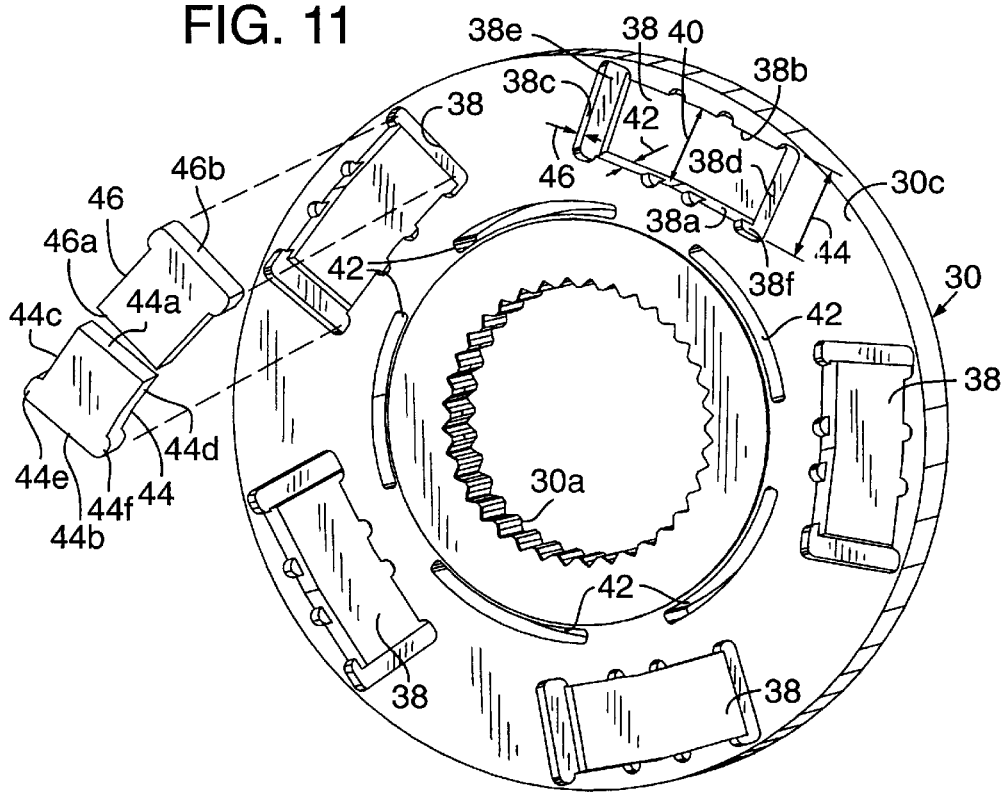
FIG. 11 is an enlarged reverse isometric view of a driving member removed from FIG. 10.

Referring to FIGS. 3–8 and 11, one face 30c of driving member 30 directed axially toward face 16c of member 16 has a plurality of pockets 38 formed therein. These pockets are circumferentially arrayed about surface 30c, are similar, and thus only one will be described in detail. Referring to FIG. 11, a pocket 38 has a pair of opposed elongate side margins 38a, 38b extending substantially circumferentially, and a pair of end margins 38c, 38d extending substantially radially. A pocket has a major portion with a radially measured width 40 throughout its length and a depth measured axially designated 43. Opposite end portions of a pocket 38 each have a width 44, greater than width 40, and a depth 46, less than depth 43. The opposite end margins 38c, 38d define what are referred to herein as shoulders, the purpose for which will be described below.

Disposed between pockets 38 and splined bore 30a are a plurality of arcuate slots 42 which extend fully through the thickness of driving member 30.

A plurality of substantially planar, plate-like, pawls 44, 46 are loosely received in each of pockets 38. The pawls are substantially similar, and describing one should illustrate the construction of all. Referring to a pawl 44 in FIGS. 4–6, 8, and 11, it will be seen that pawl 44 is substantially rectangular, having opposed engaging end surfaces 44a, 44b and opposed side edges 44c, 44d. Adjacent engaging end 44b a pair of opposed projections 44e, 44f extend outwardly beyond side margins 44c, 44d, respectively. In FIG. 11 a pair of pawls 44, 46 are shown ready to be inserted, or mounted, as they would normally be received in a pocket 38 to illustrate how similar pawls would be received in oppositely directed positions in each of pockets 38 in face 30c of driving member 30. The major portions of pawls 44, 46 are somewhat narrower than width 40 for the pocket, whereas the projecting end portions 44e, 44f produce a width greater than width 40, but less than width 44, such that they rest within the end pocket portions noted at 38e, 38f respectively. The thickness of each of the pawls is substantially similar to depth 46 for the end portions 38e, 38f of the pocket.

As seen in FIGS. 4–6, 8 and 11, the pawls are mounted with one set of their engaging ends, such as end 44a, adjacent and facing a like end 46a of its opposing pawl 46. Their opposite engaging ends, such as 44b, 46b, rest against the shoulder end portions of the pocket, such as those noted at 38c, 38d, respectively.

The pawls, also referred to as wedge members or struts herein, are mounted for movement independently of each other between what are referred to as non-engaging positions, as illustrated for pawl 44 in FIG. 4 and pawl 46 in FIG. 5, and engaging positions, as illustrated for pawl 46 in FIG. 4 and for pawl 44 in FIG. 5.

A plurality of springs, also referred to herein as yieldable biasing means, 50 are received in pockets 38 underlying pawls 44, 46. As is best seen in FIGS. 4–6, each spring 50 has a substantially planar central portion 50a and end portions 50b, 50c bent over from opposite end portions of central portion 50a. End portions 50b, 50c angle outwardly to provide yieldable spring biasing of pawls 44, 46 toward engaging positions as indicated for pawl 46 in FIGS. 4 and 6 and pawl 44 in FIG. 5. As is seen, when in its engaging position pawl 44, as shown in FIG. 5, extends between shoulder 20a on driven member 16 and shoulder 38c on drive member 30. Similarly, pawl 46 when in its engaging position, as illustrated in FIGS. 4 and 6, has one of its engaging end portions 46a in engagement with shoulder 22a on driven member 16 and its opposite engaging end 46b against shoulder 38d on the driving member 30.

Referring again to FIG. 10, a substantially disc-shaped control element, or member, 54 is interposed between face 16c of driven member 16 and face 30c of driving member 30. The control element 54 is a substantially plate-like planar disc member having a plurality of arcuate openings 54a arrayed thereabout. Intermediate the openings are solid control portions 54b of the plate. A central bore, or aperture, 54c is formed in the center of the control element of sufficient diameter to rotate about section 12a on the drive shaft. A plurality of engaging tabs 54d project perpendicularly from remainder portions of the control member axially of the clutch. Tabs 54d are positioned to extend through slots 42 in drive member 30, as will be described below.

A friction grounding member 58 has an internal bore 58a sized to be received on and rotate freely about section 12d of the drive shaft. Further it has a cylindrical outer surface 58b which, when the member is mounted on shaft 12, is concentric about axis 24.

A pair of grounding tabs, or fingers, 58c, 58d project axially from remainder portions of the friction grounding member. As best seen in FIG. 7, the clutch may be mounted in, or adjacent, a relatively stationary part indicated generally by the cross-hatched section 60 having cavities 60a, 60b formed therein. Cavities 60a, 60b are sized to receive fingers 58c, 58d, respectively, and to engage opposed sides of the fingers to prevent rotation of grounding member 58 about axis 24. Thus the friction grounding member 58 is substantially fixed relative to stationary part 60 while shaft 12 rotates therein.

A substantially cylindrical cage structures 64 has an annular end rim 64a with an inner diameter greater than the diameter of outer surface 58b of the friction grounding member. An inner rim portion 64b spaced axially from rim 64a, is substantially planar, disposed normal to axis 24, and extends radially inwardly to an inner diameter which is less than the outer diameter of friction grounding member 58 and the inner diameter of rim 64a. A plurality of connecting portions 64c extend axially between rims 64a, 64b and are arrayed thereabout at a diameter greater than the outer surface 58b of friction grounding member 58. Openings 64d are provided between connecting portions 64c. A somewhat cylindrical inner lip portion 64e projects axially from inner rim 64b. As seen in FIGS. 7 and 10, rim portion 64e has notches 64f formed therein adapted to receive end portions of tabs 54d which extend through slots 42 in drive member 30. This is best seen at the lower portion of FIG. 7. This interconnection between the tabs 54d and notches 64f in cage structure 64 interconnects the control member and cage structure, such that they will rotate as one about axis 24.

A plurality of arcuate frictional drag shoes 68 are disposed about and have radially inwardly directed arcuate inner surfaces which engage outer surface 58b of grounding member 58. The drag shoes fit within the confines of cage structure 64. Elongate sets of radially outwardly directed fins 68a, 68b, extend through openings 64d and planar end portions 68e are captured under connectors 64c. As is best seen in FIG. 3, fins 68a, 68b, are somewhat spaced apart axially and circumferentially. An annular garter spring 70 fits about cage structure 64, the outer peripheral edges of the drag shoes, and fit within spaces between opposed fins 68a, 68b to be held therein. The garter spring urges the drag shoes 68 radially inwardly to press frictionally against grounding member 58. This produces a rotational retarding force on cage structure 64 and on control member 54 connected thereto through tabs 54d which extend through slots 42 in drive member 30.

Figure 9A:
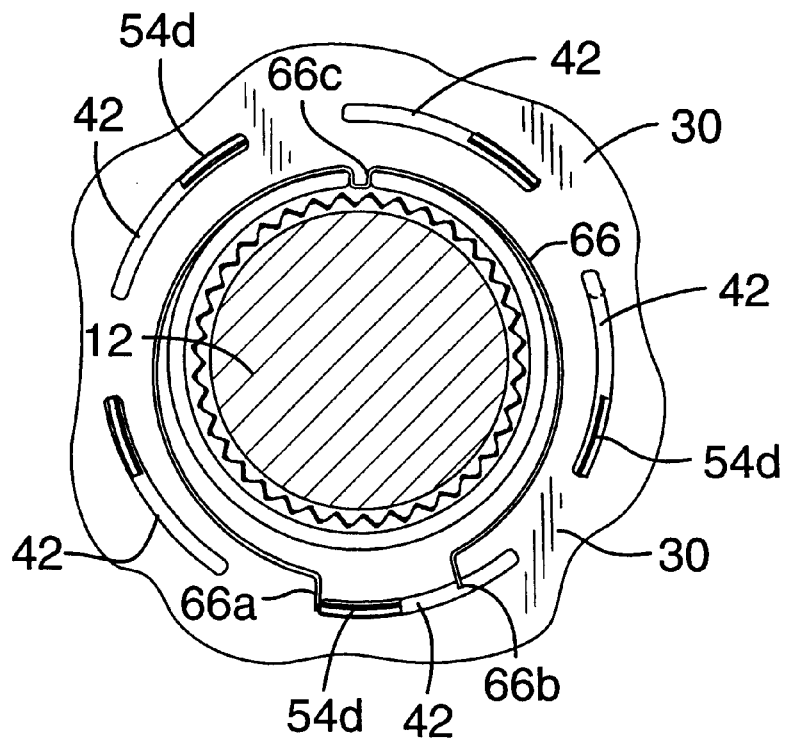
FIG. 9A is a view similar to FIG. 9 illustrating the centering spring in a second operating position.

Referring to FIGS. 7, 9, and 9A, a somewhat horseshoe-shaped centering spring 66 having opposed radially extending end tabs, or portions, 66a, 66b is disposed between driving member 30 and cage structure 64. Spring 66 has an indented portion 66c which is held in a notch in one of the driving members so that it will rotate with the main shaft 12. End tabs 66a, 66b engage opposite sides of a tab 54d extending through an arcuate opening 42 in driving member 30 and yieldably hold the tab 54d, and its associated control member 54 substantially centered in an arcuate opening 42, as best illustrated in FIG. 9.

During operation, as will become more apparent in discussion of the operation below, retarding forces produced by the frictional drag shoes 68 on grounding member 58 are sufficient to overcome the biasing force of one leg of centering spring 66, such that the tab 54d may be moved toward, or to, one end of slot 42 against the urging of spring 66. This shifting to one end of the slot against the urging of a centering spring end portion 66a is illustrated generally in FIG. 9A. Reverse movement of tab 54d may occur in the direction of spring end portions 66b for reverse operation.

Operation of the device as described thus far will now be discussed.

Referring to FIGS. 4–6, a simplified series of operational positions for the driving member 30, driven member 16, pawls 44, 46, and control member 54 are illustrated.

In FIG. 4 control member 54 is illustrated positioned with a control portion 54b thereof overlying and holding pawl 44 in its depressed non-engaging position against the urging of spring end portion 50c. In this position pawl 44 is held by control member 54 in pocket 38, out of engagement with driven member 16. An opening 54a in the control member is positioned in registry with pawl 46 such that its outer engaging end 46a is biased out of pocket 38 by spring end portion 50b. The outer end of pawl 46 engages shoulder 22a in the driven member and its opposite engaging 46b end engages shoulder 38d in the driving member. In essence the pawl pivots about its end adjacent shoulder 38b, with its opposite end shifting, or moving, substantially axially of the clutch mechanism.

Since driving member 30 is spline connected to drive shaft 12, as the drive shaft is driven under power in a one direction driving member 30 will be driven in the direction of arrow 72. Pawl 46 will act as a driving strut loaded in compression between shoulders 38d, 22a to transmit rotational torque from driving member 30 to driven member 16, causing the driven member to rotate in the direction of arrow 74.

Referring to FIG. 4A, control member 54 is positioned similarly to that shown in FIG. 4. However here, although driving members 30 may be driven in the direction of arrow 72, external forces cause driven member 16 to rotate in the direction of arrow 74 faster than drive member 30. The pawl 46 thus may be overrun by the inwardly facing surface 16c between pockets 20, 22 causing pawl 46 to be pressed downwardly into pocket 38 against the biasing force of spring end portion 50b.

Referring to FIG. 5, here control member 54 has been shifted to a second position in which a control portion 54b thereof overlies and holds pawl 46 in its depressed non-engaging position in pocket 38. An opening 54a in the control member is in registry with pawl 44 permitting its outer engaging end 44a to be biased axially outwardly from the pocket by spring end portion 50c to engage shoulder 20a on driven member 16 and shoulder 38c on the driving member. As the driving member is driven by shaft 12 in the direction of arrow 76 pawl 44 will be loaded in compression between shoulders 20a, 38c to act as a strut to drive member 16 in the direction of arrow 78.

FIG. 6 illustrates a third position for control member 54. In this position an opening 54a is disposed in registry with both of pawls 44, 46 allowing both of them to be biased by spring 50 toward their engaging positions. This is substantially a lock-up condition for the clutch, since both pawls 44, 46 are permitted to extend through the opening in the control member toward their engaging positions, and regardless of the direction that the driving and/or driven members are moving at least one of the pawls will be in operative, engaged position.

The manner in which control member 54 is shifted between its different positions illustrated in FIGS. 4, 5 and 6, respectively, will now be discussed.

Assume that initially the drive shaft 12 is stationary and control member 54 is in what may be referred to as its centered position as illustrated in FIG. 6. The control member is yieldably held in this position by centering spring 66 engaging a tab 54d as shown in FIG. 9. If drive shaft 12 is rotated in such a direction that driving member 30 moves in the direction of arrow 72 in FIG. 4 control member 54 will be retarded in its rotational movement by its interengagement with cage structure 64 and friction drag shoes 68. Explaining further, as the drive shaft 12 and driving member 30 began to rotate in the direction of arrow 72 in FIG. 4, drag shoes 68, which are biased by garter spring 70 into frictional engagement with grounding member 58, have a tendency to remain in their original position until the frictional force between the drag shoes and the grounding member is overcome. Thus drag shoes 68, cage structure 64, and control member 54 which is connected to the cage structure by tabs 54d will not begin to rotate immediately with driving member 30 in the direction of arrow 72. Instead it will overcome the biasing force of one side of centering spring 66 and assume the position illustrated in FIG. 4 and 9A. When the control member moves to this position tabs 54d will have reached the ends of slots 42 in the driving member and thus the control member will be carried rotationally with the driving member while retaining the position illustrated in FIG. 4 holding pawl 44 in its disengaged position and allowing pawl 46 to extend to its engaging position.

When the drive shaft 12 is driven in the direction opposite to that described above, the retarding force of the friction shoes will cause the control member to remain somewhat stationary and thus move relative to the driving member to the position illustrated in FIG. 5 wherein the control member overlays and holds pawl 46 in its depressed non-engaging position, and the opening 54a is in registry with pawl 44 to allow it to extend into its engaging driving position. Tabs 54d extending through slots 42 in drive member 30 would be shifted to the opposite ends of the slots from the positions illustrated in FIG. 9A, would engage tab 66b on spring 66 and move toward the opposite end of slot 42. After engaging the opposite end of the slots the tabs 54 and the control mechanism attached thereto would be shifted accordingly and thereafter be carried rotationally with the driving member.

Further mechanism, not shown, could be operationally coupled to the control member 54, other than centering springs 66, to maintain it as desired in the centered position illustrated in FIG. 6. Such might include mechanism for freeing friction ground member 58 to rotate freely about the drive shaft, such that no retarding force, other than the centering of spring 66 would be imposed on the control member.

Thus it will be seen from the above that an overrunning pawl clutch is provided having a driving member mounted for powered rotation, a driven member mounted for rotation adjacent the driving member, with each of the driving and driven members having pawl engaging shoulders on a portion of the member adjacent the other member. These pawl engaging shoulders and the pockets associated therewith may also be referred to herein as pawl-receiving portions and pawl-holding portions on the members. A plurality of rigid pawls are interposed between the driving and driven members and are positioned in opposed relationship for shifting between engaging and non-engaging positions. The pawls shift, or pivot, substantially axially between their non-engaged and engaged position. Each pawl has opposed engaging surfaces at opposite ends for engaging shoulders on the driving and driven members. One of the pawls when in its engaging position is disposed to produce driving engagement between the driving and driven members in one direction, and another of the pawls when in an engaging position is disposed to produce driving engagement between the driving and driven members in the opposite direction. A control element is mounted for shifting movement between the driving and driven members to control the position for the pawls. When the control element is in a first position it holds one of the pawls in a non-engaging position and permits the second pawl to extend to its engaging position. When the control element is in a second position it holds the second pawl in a non-engaging position and permits movement of the first pawl to its engaging position. In another position of the control element both the first and second pawls are permitted to assume their engaging positions to produce driving engagement between the driving and driven members and to prevent overrunning of the driving member by the driven member in either direction of rotation.

Referring to FIGS. 12 and 19, a clutch constructed according to another embodiment of the invention is indicated generally at 80. This clutch operates somewhat similarly to previously described clutch 10, but instead of having pawls which are pivotally mounted for extension and retraction substantially axially of the clutch, here the pawls are mounted for extension and retraction substantially radially of the device.

Referring to FIG. 19, clutch 80 includes a drive shaft 82 having a first bearing, or journal, portion 82a and a spline portion 82b. The longitudinal axis of shaft 82 defines the rotational axis 94 for the clutch.

A driven member 86, which may be a sprocket, gear, or other form of torque transmitter, as shown here has external sprocket teeth, or gear teeth, 86a allowing it to engage an adjacent gear or drive chain. An internal bore 86b has a diameter allowing it to fit rotatably on portion 82a of drive shaft 82. A radially inwardly facing annular surface 86c spaced radially outwardly from bore 86b has a plurality of notches 90, 92 formed therein as best seen in FIGS. 12–15. These notches have engaging shoulders 90a, 92a, respectively. A plurality of such notches 90, 92 are arrayed about the surface of portion 86c.

A drive, or driving, member 100 having a splined central bore 100a is received and held on splined portion 82b of the drive shaft, such that rotation of the drive shaft under power serves to rotate drive member 100 under power.

Figure 20:
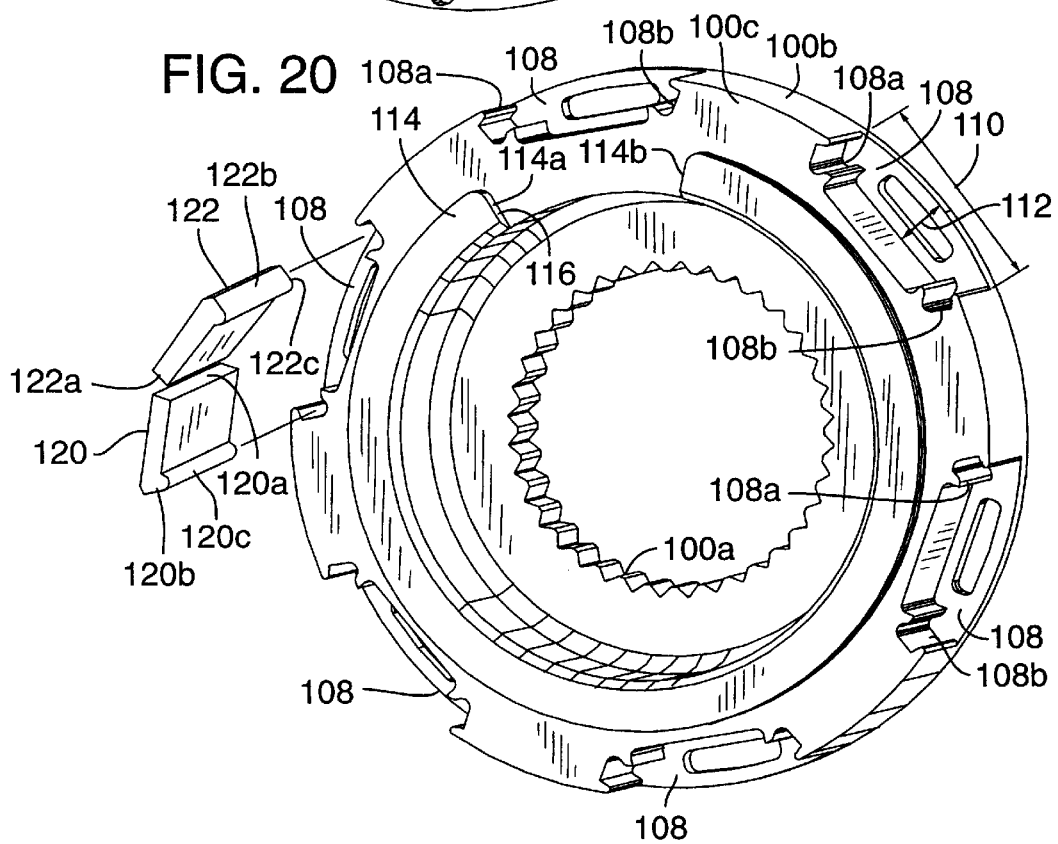
FIG. 20 is an enlarged reverse isometric view of a driving member removed from FIG. 19.

The drive member has a circumferential outer edge 100b in which are formed a plurality of pockets 108 arrayed circumferentially thereabout. Referring to FIG. 20, the pockets 108 are similar, and thus only one will be described in detail. A pocket 108 has a length measured circumferentially as noted generally at 110. It has a depth indicated generally at 112. At opposite ends are formed pawl-receiving notches 108a, 108b.

On the axially facing surface 100c, facing toward driven member 86, an axially projecting rim 114 is formed spaced radially inwardly from outer surface 100b of the driving member. An opening 116 is defined between opposite ends 114a, 114b of rim 114.

A plurality of pawls 120, 122 are received in pockets 108 as illustrated generally FIGS. 12–15. Each pawl is a substantially rectangular planar, plate-like, element having opposed engaging ends 120a, 120b for pawl 120 and 122a, 122b for pawl 122. Each pawl has a rounded projection on its underside adjacent its rear engaging end (120c, 122c respectively). These rear end portions of pawls 120, 122 rest in notches 108a and 108b of pockets 108 and permit pivoting of the pawls substantially radially of the clutch mechanism between engaging and non-engaging positions as illustrated in FIGS. 12–15.

Received in pockets 108 under pawls 120, 122 are springs 124 shaped somewhat similar to previously described springs 50. A spring 124 has a substantially planar central section 124a and bent over end portions 124b, 124c positioned to actuate pawls 120, 122 respectively.

Figure 17:
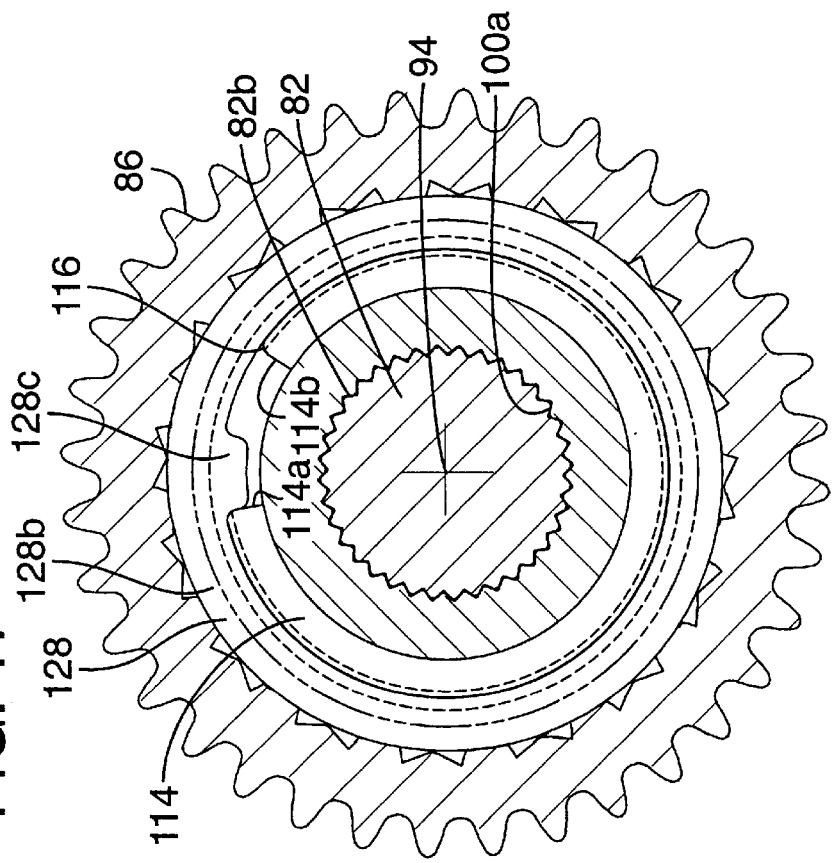
FIG. 17 is a cross sectional view taken generally along the line 17—17 in FIG. 16.
Figure 16:
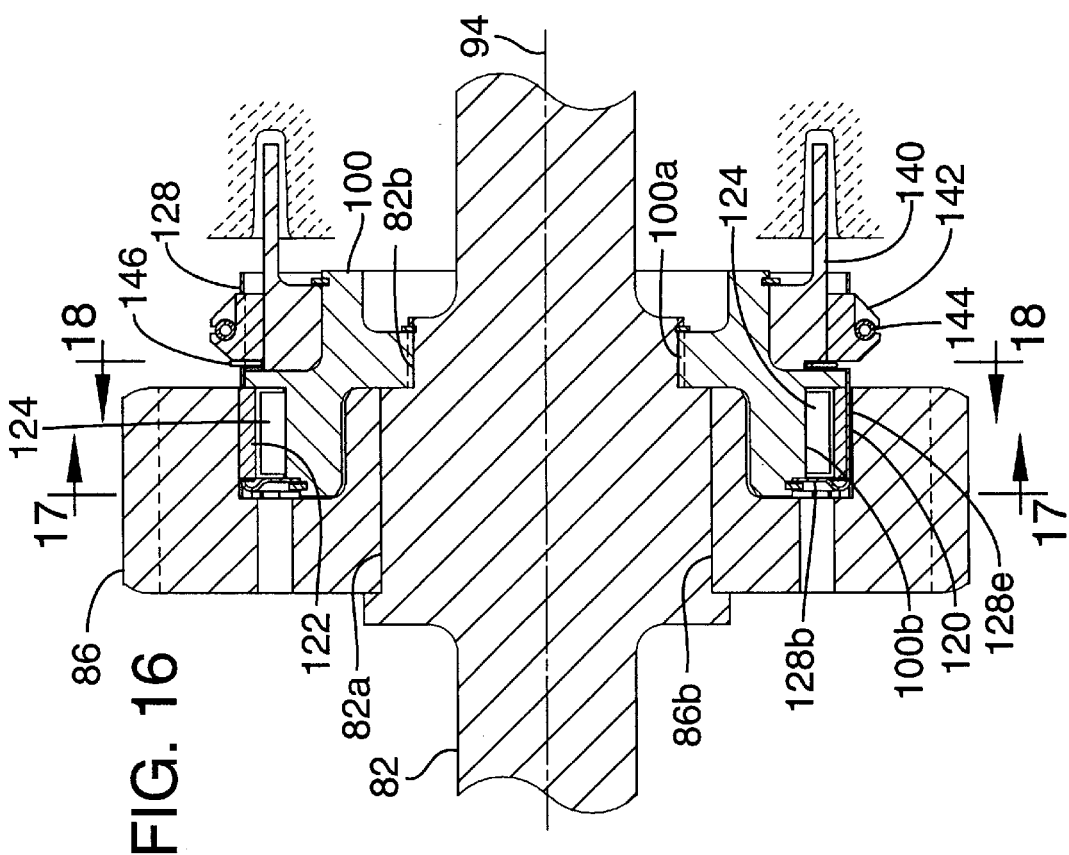
FIG. 16 is a cross sectioned view taken generally along the line 16—16 in FIG. 12.

A control element, or member, 128 has a cylindrical plate-like circumferential rim portion 128a and a radially inwardly directed portion 128b. The inwardly directed portion 128b rides on rim 114 and a tab 128c projecting radially inwardly therefrom is received in opening 116 between rim ends 114a, 114b (FIG. 17). Tab 128c has a circumferential width which is less than the width of opening 116 in rim 114.

Rim 128a of control member 128 has a first set of circumferentially spaced apart openings 128d, with solid control portions 128e therebetween. A second set of circumferentially spaced apart openings 128f are spaced axially of the device from openings 128d. Two slot openings 128g, 128h spaced a short distance apart are formed between openings 128d, 128f, and have a solid centering portion 128i therebetween.

In the assembled device rim 128a of control element 128 is interposed between the circumferential inner surface 86c of driven member 86 and the circumferential outer surface 100b of drive member 100. Since the control element 128 is a thin sheet-like, or plate-like, member it can shift rotatably in the space between said surfaces of the driving and driven members, as will be described below.

Openings 128d and solid control portions 128e are so disposed that they may be moved into position over selected pawls for the same purpose as described for clutch 10 in the previously described embodiment.

Explaining further, and referring to FIGS. 13–15A, in FIG. 13 when member 100 is driven in the direction of arrow 130 control member 128 is shifted to a first position in which control portion 128e overlies and holds pawl 120 depressed in pocket 108 and out of engagement. Opening 128d is disposed in registry with pawl 122 which is urged by spring portion 124c outwardly to its engaged position as illustrated in FIG. 13 extending between shoulder 90a in notch 90 and a shoulder in pocket portion 108b. Pawl 122 is loaded in compression between its opposed ends to act as a strut to drive member 86 in the direction of arrow 132.

Conversely, when driving member 100 is driven under power in the direction of arrow 136 and control member 128 is shifted to the position illustrated in FIG. 15 a control portion 128e holds pawl 122 in its disengaged, depressed, position in pocket 108. An opening 128d is in registry with pawl 120 which may be yieldably urged outwardly by its associated spring portion 124b to engage a shoulder 92a on notch 92 of the driven member and its opposite associated shoulder in pocket 108a to provide a driving interconnection to drive member 86 in the direction of arrow 138.

FIG. 15A illustrates the parts generally in positions shown and described with FIG. 15, but in an overrunning condition. Here driven member 86 is driven by external forces in direction 138 faster than driving member 100 such that it may overrun pawl 120.

FIG. 14 illustrates a condition in which control member 128 is positioned with an opening 128d disposed in registry with both pawls 120, 122 allowing for lock up of the clutch such that overrunning will not occur in either direction.

This embodiment of the invention has a friction grounding member 140 similar to that previously described at 58 and plurality of friction drag shoes 142 and garter spring 144 similar to those previously described at 68 and 70 respectively. The drag shoes rest upon the circumferential outer surface of grounding member 140 and within rim 128a of control member 128. The finned outer surfaces of the drag shoes extend outwardly through openings 128f with garter spring 144 extending thereabout to yieldably urge the drag shoes into frictional engagement with grounding member 140.

Referring to FIGS. 18–19 a somewhat horseshoe-shaped centering spring 146 extends about a portion of driving member 100 but inwardly of the outer rim portion 128a of control member 128. The centering spring has a pair of radially outwardly directed end portions 146a, 146b and a securing portion 146c which fits in a notch in the driving member 100 in a position diametrically opposed to end portions 146a, 146b.

The end portions 146a, 146b of the centering spring, as is best illustrated in FIG. 18, are received in slots 128g, 128h on opposite sides of centering portion 128i in the control member. In the position illustrated in FIG. 18 the control member 128 is held in a substantially centered position such as illustrated in FIG. 14. When the drive shaft and driving member 100 initially are rotated in one direction and the drag shoes retard rotation of the control member, the control member will act against the biasing of centering spring 146 in one direction as illustrated in FIG. 18A, thus to place the control member in the position illustrated in FIG. 13. Initial rotation of the drive shaft and driving member 100 in the opposite direction and the retarding force of the drag shoes will urge the control member to act against the opposite end portion of the centering spring as illustrated in FIG. 18B causing the control member to position itself as illustrated in FIG. 14.

The operation of the device is similar to that previously described for clutch 10, in that start up rotation of the drive shaft 82 and driving member 100 in one direction precedes movement of the control member 128 due to its retardation caused by the friction of drag shoes 142 on grounding member 140. The amount of rotation allowed between driving member 100 and control member 128 is controlled by the amount of movement allowed for tab 128c in opening 116 between end portions 114a, 114b of rim 114 on the drive member (see FIG. 17). Once driving member 100 has rotated to a point where tab 128c engages one of end portions 114a, 114b control member 128 will rotate with the driving member. With this relative movement between the driving member and control member the control member is shifted between the driving positions illustrated in FIGS. 13 and 15. The centering spring 146 is operable to position the control member as illustrated in FIG. 14.

A third embodiment of the invention is indicated generally at 150 in FIGS. 21–27.

Here a drive shaft 152 has a driven member 154 mounted for free rotation thereon. Driven member 154 is substantially similar to that previously described at 86 above and has similarly disposed internal pockets 156, 158 with pawl engaging shoulders 156a, 158a.

A driving member 162 is spline-connected to drive shaft 152 for powered rotation therewith. The driving member has a substantially cylindrical outer surface 162a on which a pair of axially spaced radially projecting rims 162b, 162c are formed. The rims have axially aligned openings 162d, 162e formed therein, which are arrayed about the driving member.

A plurality of rocker style pawls 166 are disposed about and mounted on driving member 162. Describing a pawl 166 generally, it is an elongate member having a substantially rectangular radially outwardly facing surface 166a and opposed ends 166b, 166c. Extending outwardly from opposite sides of the pawl, intermediate ends 166b, 166c are a pair of substantially similar projections 166d, 166e.

Figure 23:
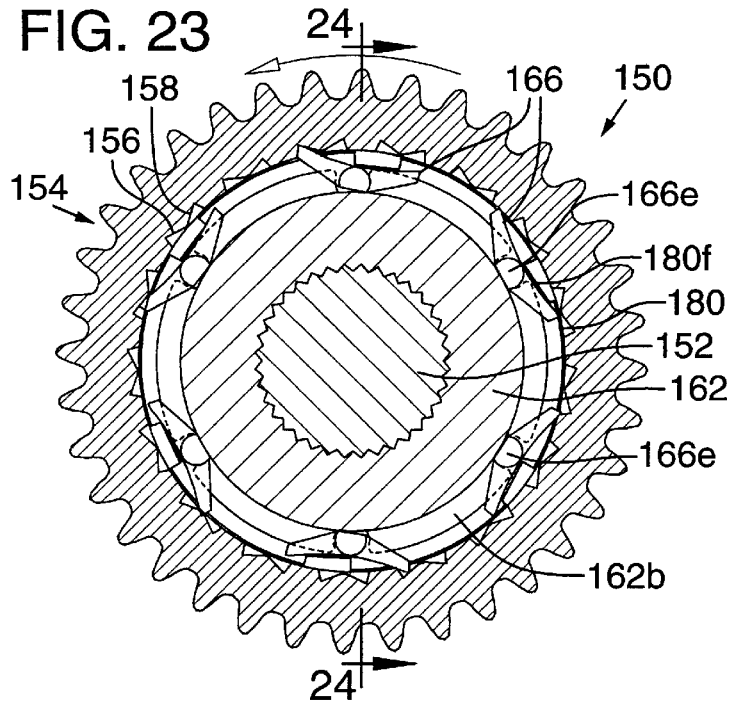
FIG. 23 is an enlarged cross sectional view of the clutch taken along the line 23—23 in FIG. 21.
Figure 24:
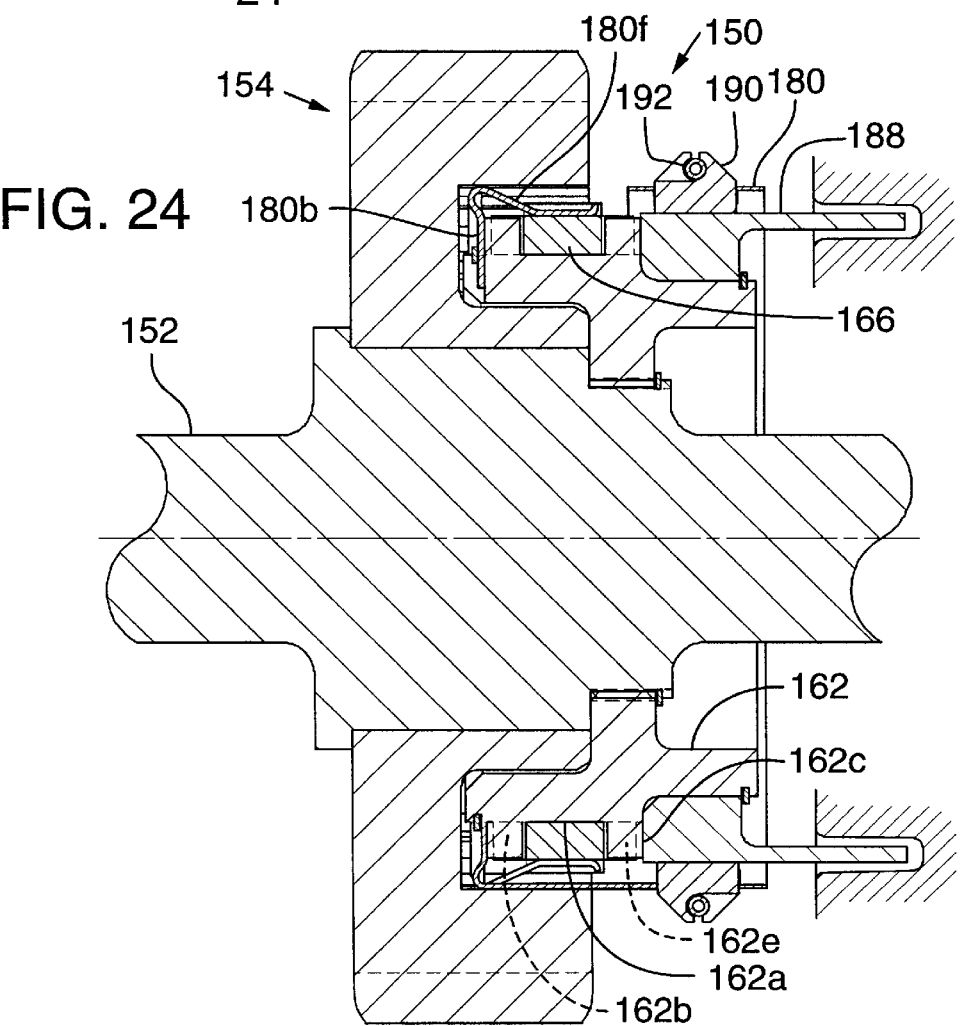
FIG. 24 is an enlarged cross sectional view taken generally along the line 24—24 in FIG. 23.
Figure 25:
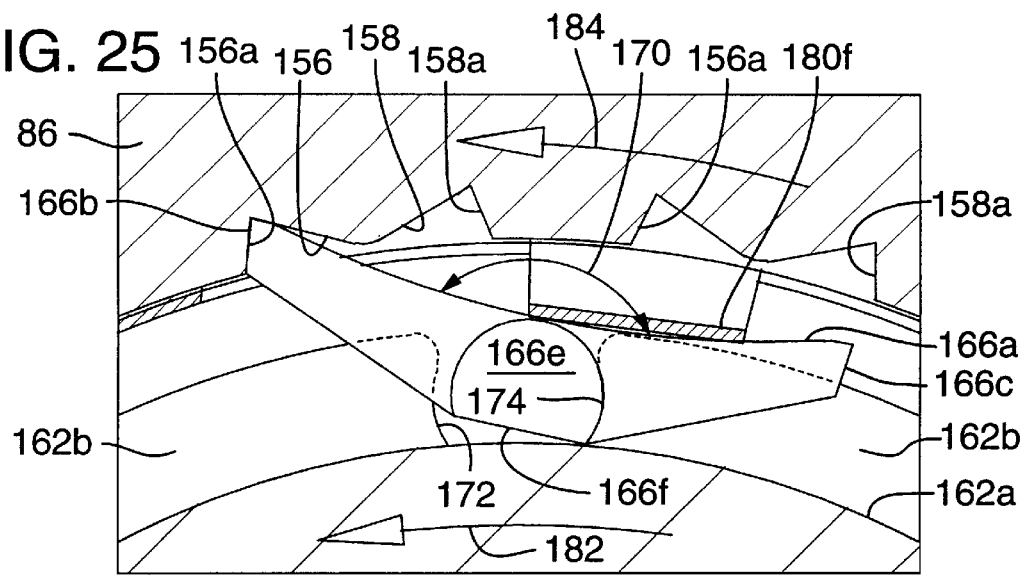
FIGS. 25–27 are enlarged views of different operating conditions for engaging and control parts in the third embodiment of the invention.
Figure 26:
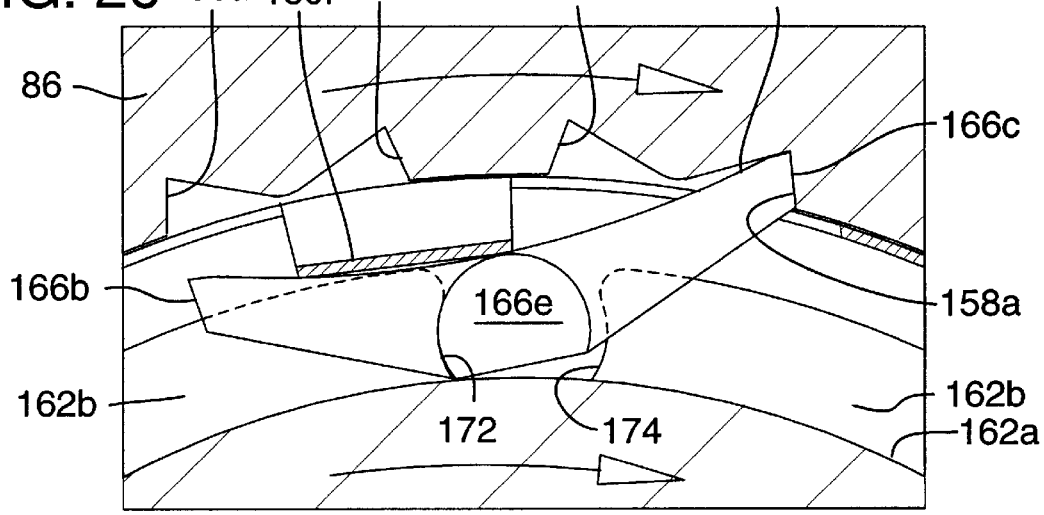

As best seen in FIGS. 23, 25–26, projections 166d, 166e have substantially semicircular radially outwardly directed surfaces. The central portion of the underside of pawl 166 continuing outwardly to the ends of projections 166d, 166e has a planar, or non-curvilinear, surface 166f.

The portions of pawl 166 projecting outwardly from projections 166d, 166e toward end margins 166b, 166c project radially outwardly from the central portion of the pawl at a shallow angle indicated generally at 170. Preferably, this angle may be in the range of 140 degrees to 175 degrees.

As best seen in FIGS. 25 and 26 rims 162b, 162c adjacent openings 162d, 162e have opposed margins indicated generally at 172, 174. These margins form shoulders against which opposite sides of projections 166d, 166e may bear while the pawl is in an engaged position.

The pawls are loosely mounted on the periphery 162a of driving member 162, such that they are able to rock from a centered position, with the planar bottom surface 166f resting on the peripheral surface 162a of the driving member, to angularly disposed positions as illustrated FIG. 25 and 26. The flat undersurface 166f provides a substantially centered position for the pawls, in which the pawls are out of engagement with the driven member.

Referring to FIG. 22 a control member 180 is a somewhat cage-like structure having a cylindrical sheet-like, or plate-like, outer rim portion 180a and a radially inwardly directed portion 180b. A plurality of substantially rectangular openings 180c are spaced apart circumferentially about the control member adjacent one of its axial ends, and a plurality of substantially rectangular openings 180d are spaced apart circumferentially thereabout adjacent its opposite axial end. Solid portions 180e exist between openings 180c. Each opening 180d has a spring finger, or tab, 180f extending axially thereinto from its connection with radially inwardly directed rim 180b. Spring fingers 180f connect only at one of their sets of ends to remainder portions of the cage and thus their free ends, which are not attached to remainder portions of the cage, may move radially inwardly and outwardly relative to the structure. The fingers, or tabs, 180f are resilient to act as springs.

As seen in FIGS. 23–26, pawls 166 rest within openings 180d, with a resilient spring finger 180f engaging the radially outwardly directed surface of each pawl.

Figure 27:
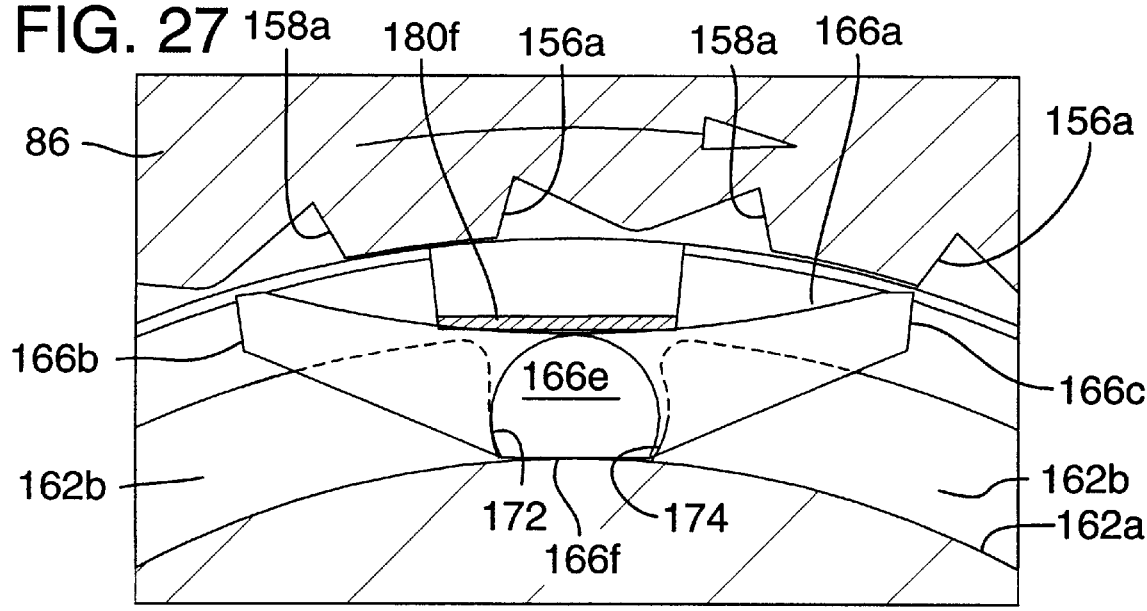

The structure is such that, as seen in FIGS. 25–27, shifting of the control member relative to the driving and driven members serves to rock the pawls 166 from their centered, non-engaging position, as illustrated to FIG. 27, to either of two engaged positions as illustrated in FIGS. 25 and 26 respectively.

Explaining further, in FIG. 27 the control member is illustrated essentially centered with the spring finger portion 180f positioned substantially centrally of the pawl. In this position its opposed ends 166b, 166c are held in a position with the bottom surface 166f of the central portion of the pawl resting on surface 162a of the drive member and its opposite end portions out of engagement with driven member 86.

If the control member 180 is rotated relative to the driving member to the position illustrated in FIG. 25 spring finger 180f presses radially inwardly on a portion of the rocker pawl between its central portion and engaging end 166c which rocks it to the position illustrated in FIG. 25 with its engaging end portion 166b directed outwardly through a portion of opening 180d. When the driving member 162 is driven under power in the direction of arrow 182 the pawl will be placed in compression between shoulder 174 on the rims of the drive member and the shoulder 156a of pocket 156 to act as a strut to produce driving force in the direction of arrow 184 for the driven member 154.

Conversely, shifting of the control member in the opposite direction, as illustrated in FIG. 26, urges the opposite end portion 166c of the pawl outwardly to engage the shoulder 158a of a notch 158. Pawl 166 thus will be placed in compression between such shoulder 158a and shoulder 172 on the rims on the driving member.

Figure 26A:
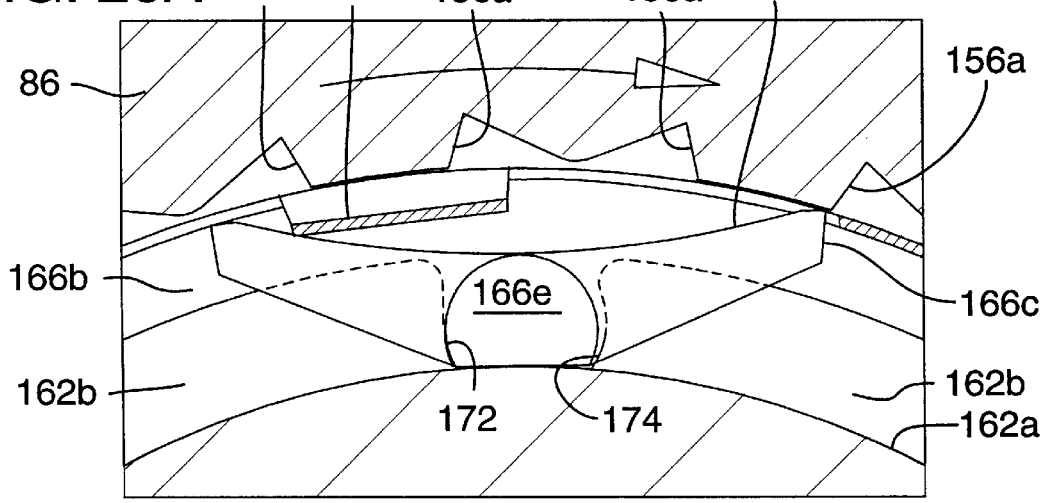

As shown in FIG. 26A overrunning is permitted should external forces cause the driven member to be rotated faster than the driving member. In such case the inner surface of the driven member will urge the engagement end of the pawl downwardly, or radially inwardly, the central portion of the pawl will rock on surface 162a of the driving member, and spring finger 180f will be urged outwardly against its normal radially inwardly directed biasing force to permit overrunning.

In this embodiment a grounding member 188 (similar to previously described grounding member 58), friction drag shoes 190 (similar to previously described drag shoes 68), and garter spring 192 (similar to previously described garter spring 70) are mounted and operate in the same fashion as those previously described. Drag shoes 190 rest on the peripheral outer surface of grounding member 188, with their finned outer portions extending through openings 180c in the control member. Garter spring 192 is stretched thereabout to provide inwardly directed pressure to produce frictional drag between the drag shoes and grounding member 188. This produces a retarding force on the cage structure of control member 180 to cause it to shift to its various operating conditions as previously described.

Although in this embodiment the pawls are illustrated positioned on the circumference of the driving member and mounted for rocking about axes extending axially of the clutch, it should be recognized that an overrunning clutch using rocker style pawls also may be used in a face-to-face orientation.

Explaining further, as in the first two embodiments illustrated in FIGS. 1–20 where pawls are shown shiftable both axially and radially, in this last embodiment driving and driven members could be placed in face-to-face relationship with the driven member having axially oriented notches and the driving member having means for mounting rocker style pawls on its axially facing surface directed toward the notches on the driven member. The rocker style pawls would be mounted for shifting axially between engaged and non-engaged positions about rocker axes which extend radially on the axis of the clutch. A substantially disk-shaped control plate with appropriate openings and spring fingers would be interposed between the driving and driven members to control the positions of the pawls.

Referring to FIG. 37, a substantially disk-shaped control member 200 is interposed between driven member 204 and driving member 208. A central bore 210, or aperture, is formed in the center of the control element of sufficient diameter to rotate about drive shaft 212, and more particularly, first journal portion 212a. A plurality of engaging tabs 214 project perpendicularly from the control member 200 axially of the clutch. The tabs 214 are positioned to extend through slots 216 in the driving member 208.

A plurality of spring tabs or fingers 218 extend from the control member 200. The spring tabs have a portion 218a which extend somewhat perpendicularly from the control member, and a portion 218b extending from the portion 218a in a direction somewhat radially from the control member 200. The fingers or tabs 218 are resilient to act as springs.

As seen in FIGS. 32–34 and 36, rocker pawls 220 rest in notches 222 disposed in the driving member 208. The rocker pawls 220 are mounted in the notches such that they are capable of shifting between engaged and non-engaged positions about radially-extending rocker axes (as described below). Describing each rocker pawl 220 generally, it is an elongate member having a substantially rectangular, axially outwardly facing surface 220a and opposed ends 220b. Extending outwardly from opposite sides of the pawl, intermediate ends 220b, are a pair of substantially similar projections 220c.

As best seen in FIGS. 32–34 and 37, projections 220c have substantially semicircular axially directed surfaces 220d. The portions of pawl 220 from projections 220c toward end margins 220b extend outwardly from the central portion of the pawl at a shallow angle.

As best seen in FIGS. 32–34, and 39, adjacent openings, or indentations, 226a of driving member 208 have opposed margins indicated generally at 226b. These margins form shoulders against which opposite sides of projections 220c may bear while the pawl is in an engaged position. More specifically, the rocker projections 220c are disposed within indentations or openings 226a of driving member 208. In this way, the projections 220c may pivot, or rock about radially extending axes in the indentations, or openings, 226a to position the rocker pawls 220 in engaging or non-engaging positions, as discussed below.

The driven member 204 is mounted on the drive shaft 212 for free rotation thereon. Driven member 204 is substantially similar to that previously described at 16 above, and has similarly disposed internal pockets, or notches, 228 with pawl-engaging shoulders 228a.

As seen in FIGS. 32–34, for instance, the resilient spring fingers 218 engage the outwardly directed surface of each pawl 220. As shown in FIGS. 32–34, in particular, shifting of the control member 200 relative to the driving 208 and driven 204 members serves to rock the pawls from either of two engaging positions as illustrated in FIGS. 32 and 34. (FIG. 33 illustrates an overrun condition when the mechanism is in a drive position, as illustrated by FIG. 32.) In particular, in FIG. 32, if the control member 200 is rotated relative to the driving member 208 to the position illustrated, spring finger 218 presses axially inwardly on a portion of the rocker pawl 220 between its central portion and one engaging end 220b. The pawl 220 thus is rocked to the position illustrated in FIG. 32. When the driving member 208 is driven under power in the direction of arrow 232, the pawl 220 will be placed in compression between shoulder 226b of the driving member 208 and a shoulder 228a of pocket or notch 228 to act as a strut to produce driving force in the direction of arrow 232 for the driven member.

Conversely, shifting of the control member 200 in the opposite direction, as illustrated in FIG. 34, urges (via the spring fingers 218) the opposite end portion 220b of the rocker pawl 220 outwardly to engage the opposite shoulder 228a of notch 228. Pawl 220 thus will be placed in compression between a shoulder 228a on the driven member 204 and a shoulder 226b on the driving member 208, to produce driving force in the direction of arrow 233.

As shown in FIG. 33, overrunning is permitted should external forces cause the driven member 204 to be rotated faster than the driving member 208. In such case, the driven member 204 will urge the engagement end 220b of the pawl axially out of driving engagement with a shoulder 228a, the central portion of the pawl will rock on the driving member 208, and spring finger 218 will be urged axially toward driven member 204 to permit overrunning.

In this embodiment, a grounding member 234 (similar to previously described grounding member 58), friction drag shoes 236 (similar to previously described drag shoes 68) and garter spring 238 (similar to previously described garter spring 70) are mounted and operate substantially in the same fashion as those previously described. Drag shoes 236 rest on the peripheral outer surface 240 of grounding member 234, with their finned outer portions 242 extending through openings 244 in the cage 246 (similar to previously described cage 64). Garter spring 238 is stretched thereabout to provide inwardly directed pressure to produce frictional drag between the drag shoes 236 and grounding member 234. This produces a retarding force on the cage 246 structure to cause control member 200 to shift to its various operating conditions as previously described. A centering spring 248 and annular spring clip 250 are provided and substantially operated as previously described above as to spring 66 and clip 34.

Figure 28:
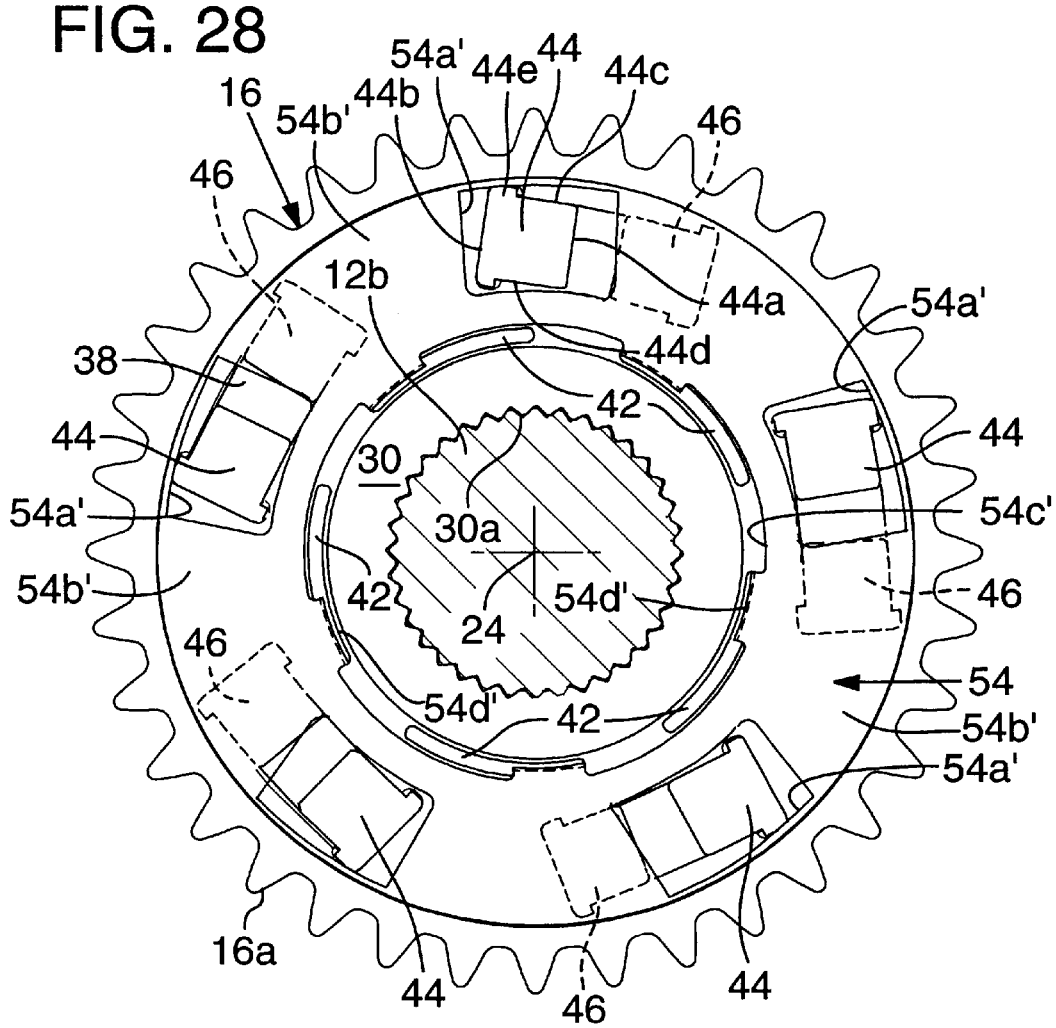
FIG. 28 is a view similar to prior FIG. 8, but illustrating another embodiment of the invention wherein a control member has narrower control openings.

Referring to FIG. 28 another embodiment of the invention is illustrated which is somewhat similar to that previously described in regard to FIGS. 1–11. All parts are substantially the same, other than control element, or member, 54. Here a revised control member, or element 54' is illustrated having arcuate openings 54a' arrayed thereabout. Intermediate the openings are solid control portions 54b' of the plate. A central bore, or aperture, 54c' is formed in the center of the control member of sufficient diameter to rotate about section 12a of the drive shaft. A plurality of engaging tabs 54d' project perpendicularly from remainder portions of the control member axially of the clutch. Tabs 54d' are positioned to extend through slots 42 in drive member 30 as previously described for the earlier embodiment.

Figure 29:
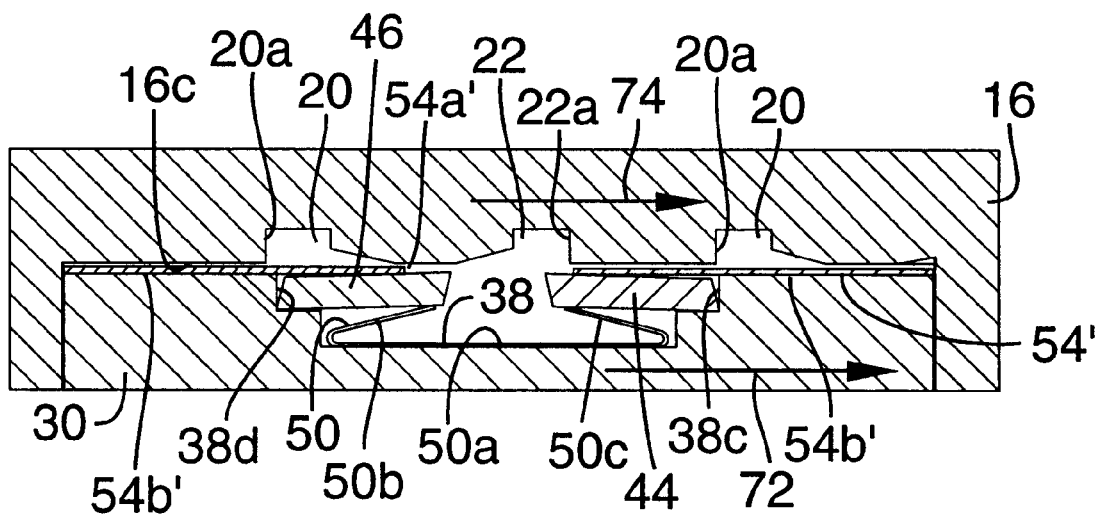
FIG. 29 is a view similar to FIGS. 4–6, but illustrating an operative position for the control plate of the embodiment illustrated in FIG. 28.

In this embodiment openings 54a' are narrower than the openings 54a in the previously described embodiment. An opening 54a' is sufficient to allow a single pawl to extend therethrough into its engaging position when the opening 54a' is positioned in registry with such pawl. However, as illustrated in FIG. 29, when the control member 54' is positioned in what may be termed a centered position in FIG. 29 portions 54b' adjacent opposite sides of opening 54a' bear against pawls 44, 46 to hold them depressed in their non-engaging positions.

Explaining further, whereas in the earlier embodiment, as described in regard to FIGS. 1–11, when the control member was held in a substantially centered position by centering spring 66, both pawls were allowed to extend through the wider opening 54a in the control plate to engaging positions to provide lock up in both directions of rotation. Whereas, in the embodiment illustrated in FIGS. 28–29 centering of the control plate, or member, which could be controlled in a manner similar to the earlier embodiment, will maintain the pawls concurrently in non-engaging positions to permit free-wheeling between the driving and driven members with no engagement therebetween.

Figure 30:
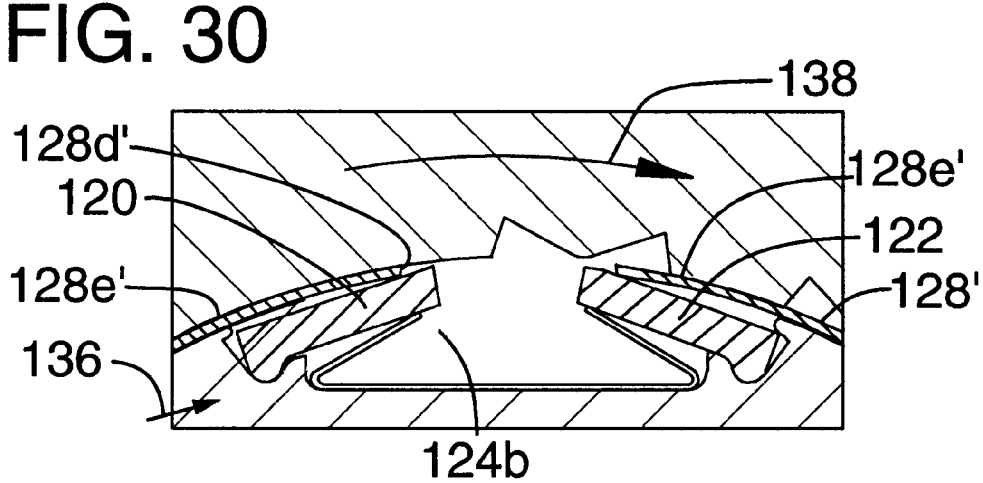
FIG. 30 is an illustration similar to FIGS. 13–15A of another embodiment of the invention showing a revised control member operable in a selected position to hold both pawls concurrently in non-engaging positions.
Figure 36:
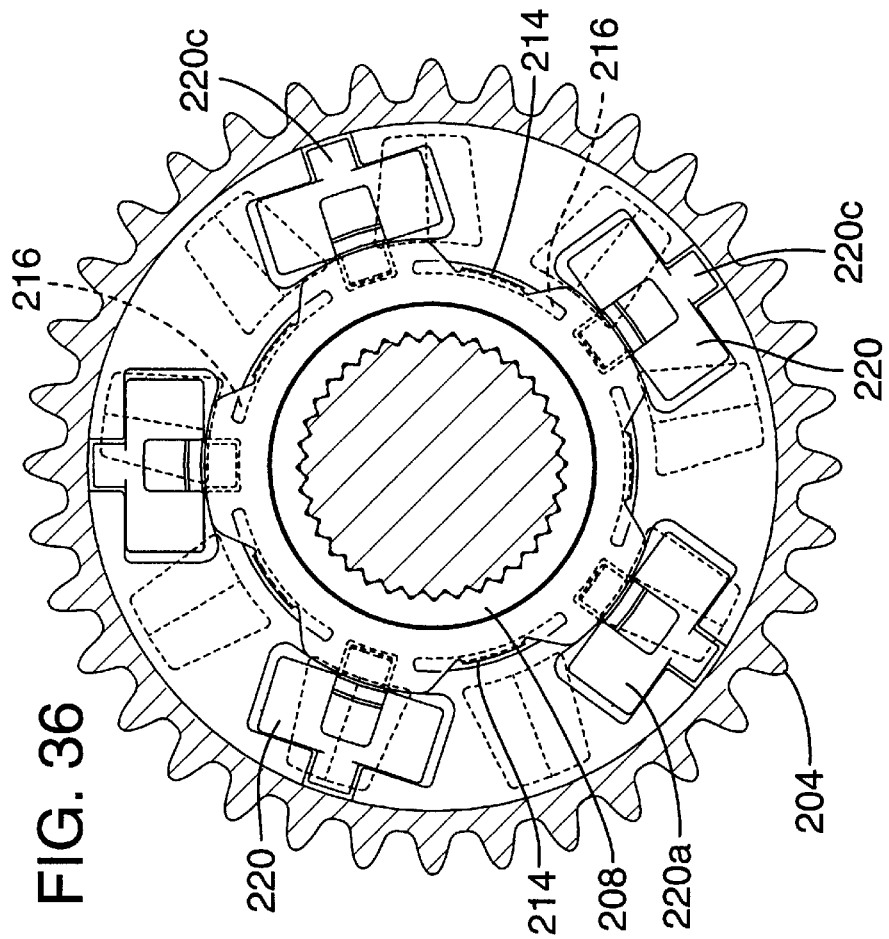
FIG. 36 is a cross-sectional view along line 36—36 of the embodiment of the clutch shown in FIG. 35.
Figure 35:
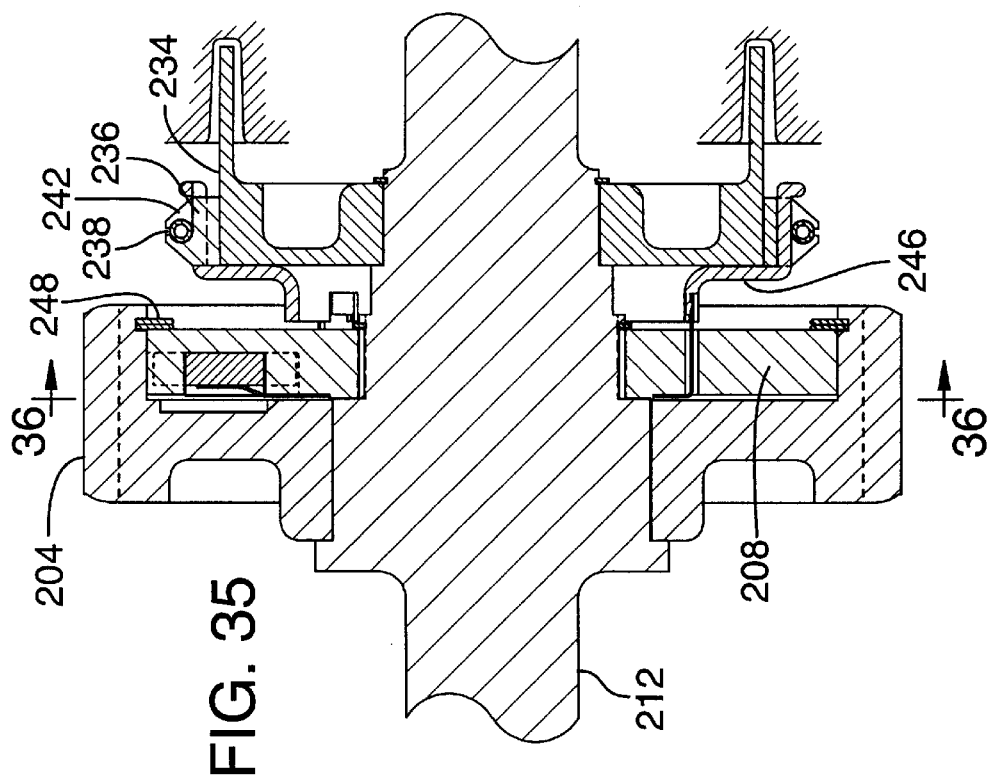
FIG. 35 is an enlarged view of the embodiment of the clutch shown in FIG. 31.

FIG. 30, which is somewhat similar to prior FIGS. 13–15A illustrates another embodiment of the invention wherein the pawls are mounted for shifting radially between engaging and non-engaging position. Here, all elements of the device are generally as previously described in regard to the embodiment illustrated in FIGS. 12–20, but the control member in this embodiment denoted at 128' has a narrower opening 128d' such that when it is in its centered position, as illustrated in FIG. 30, it will hold both pawls 120, 122 in depressed, non-engaging positions to permit free-wheeling movement between the driving and driven members without the pawls engaging in either direction of rotation between the driving and driven members. Again, as described in regard to FIGS. 28 and 29, the opening 128d' is wide enough to allow a single pawl to extend therethrough into an engaging position when the opening 128d' is positioned in registry with a selected pawl.

Further, centering of the control element, or member in the position illustrated in FIG. 30 may be accomplished by mechanism as previously described for other embodiments.

Although preferred embodiments of the invention have been described herein, it should be apparent to those skilled in the art that variations and modifications may be made in the invention without departing from the spirit of the invention as set out in the following claims.

We claim:

1. A two-way over-running pawl clutch applicable to a vehicle drive line comprising a driving member mounted for powered rotation, a driven member mounted for rotation adjacent the driving member, each of the driving and driven members having pawl-engaging shoulders on a portion of said member adjacent the other member, a plurality of rigid pawls interposed between said driving and driven members mounted for shifting between engaging and non-engaging positions, each pawl having opposed engaging surfaces for engaging shoulders on the driving and driven members, with a first of said pawls when in an engaging position being disposed to produce driving engagement between the driving and driven members in one direction, and a second of said pawls when in an engaging position being disposed to produce driving engagement between the driving and driven members in the opposite direction, a control element mounted for shifting movement between said driving and driven members operable to control the positions of said pawls, said control element when in a first position holding said first pawl in a non-engaging position and permitting movement of the second pawl to its engaging position, and when in a second position holding said second pawl in a non-engaging position and permitting movement of the first pawl to its engaging position, and operating mechanism operatively connected to said control element to selectively shift said control element between its first and second positions, said operating mechanism comprising a friction coupling that retards rotation of said control element.

2. The clutch of claim 1, which further comprises biasing means yieldably urging a pawl toward its engaging position.

3. The clutch of claim 2, wherein one of said members has a pocket formed therein and a pawl is received in said pocket.

4. The clutch of claim 3, wherein said biasing means is operatively coupled to a pawl to urge one end of said pawl to shift outwardly from said pocket toward the other member.

5. The clutch of claim 4, wherein the biasing means comprises a spring.

6. The clutch of claim 2, wherein a pawl when in its engaging position will be positioned to produce driving engagement between the driving and driven member when the driven member rotates no faster than the driving member, but upon rotation of the driven member faster than the driving member said driven member has portions which will act against said pawl to shift the pawl toward its non-engaging position against the urging of the biasing means to permit over-running by the driven member.

7. The clutch of claim 1, wherein said control element is shiftable to a third position in which both said first and second pawls are permitted to assume their engaging positions to produce driving engagement between the driving and driven members and to prevent over-running of the driving member by the driven member in either direction of rotation.

8. The clutch of claim 7, which further comprises centering mechanism coupled to said control member to yieldably urge said control member to said third position.

9. The clutch of claim 1, wherein said control element is shiftable to another position in which both said first and second pawls are held in their non-engaging positions.

10. The clutch of claim 1, wherein said control element has a control portion which when positioned over a pawl holds said pawl in its non-engaging position.

11. The clutch of claim 10, wherein said control element has an opening therein, which opening permits a pawl to extend therethrough to its engaging position.

12. The clutch of claim 11, wherein said opening has sufficient size to allow an engaging portion of both said first and second pawls to extend concurrently therethrough to their engaging positions.

13. The clutch of claim 1 which further comprises a stationary ground member and said friction coupling comprises a drag member operatively coupled to said control element and yieldably urged into frictional engagement with said ground member.

14. The clutch of claim 1, wherein a pawl is mounted on one of said driving and driven members for pivoting relative thereto.

15. The clutch of claim 14, wherein the engaging surfaces of a pawl comprise oppositely facing end surfaces thereof.

16. The clutch of claim 14, wherein the member on which a pawl is mounted has a pocket formed in a surface thereof which receives a major portion of said pawl when the pawl is in its non-engaging position.

17. The clutch of claim 16, wherein said control element comprises a plate-like member interposed between said driving and driven members having an opening therein and being shiftable relative to said driving and driven members to selectively expose a pawl to permit it to extend through said opening to its engaging position.

18. The clutch of claim 16, wherein said pocket has a length as measured in the direction of rotation of the member sufficient to receive two pawls end-to-end with an adjacent set of their engaging ends facing each other and their opposite ends engaging shoulders formed in the pocket, said pawls being pivotally mounted in the pocket to permit their adjacent engaging ends to move out of the pocket toward the other of the driving and driven members, and which further comprises biasing means yieldably urging each of said pawls to pivot independently toward their engaging positions.

19. The clutch of claim 1 wherein a pawl when in its engaging position is loaded in compression between the shoulders of the driving and driven members.

20. The clutch of claim 1, wherein said driving and driven members are substantially cylindrical, concentrically positioned with one surrounding the other, and said engaging shoulders are formed in adjacent facing surfaces of said members.

21. The clutch of claim 1, wherein said driving and driven members comprise rotating plates disposed in face-to-face relation for rotation about a substantially common axis, and said engaging shoulders are formed in adjacent facing surfaces of said members.

22. The clutch of claim 1, wherein said driving and driven members have adjacent facing surfaces on which said shoulders are formed, said control element comprises a plate-like member interposed and mounted for shifting between the facing surfaces of the driving and driven members, and said control element has a control portion which when positioned over a pawl holds the pawl in its non-engaging position and has an opening therein adapted to be placed in registry with a selected pawl to permit the pawl to extend therethrough to its engaging position.

23. The clutch of claim 1, wherein a pawl has a central pivot portion pivotally mounted in a pocket formed in one of said driving and driven members, and opposed end portions which extend in opposite directions of rotation from said central pivot portion, and the disposition of the control element determines which end portion extends toward the other of said driving and driven members to provide driving connection therebetween.

24. The clutch of claim 23, wherein said end portions extend outwardly from said pivot portion at a shallow angle relative to each other in the direction of the other of said driving and driven members.

25. The clutch of claim 24, wherein said angle between said end portions is in a range of from 140 degrees to 175 degrees.

26. The clutch of claim 24, wherein said control element has a control portion which when positioned over one pawl end portion holds said pawl end portion in its non-engaging position and has an opening therein adapted to be disposed in registry with the other pawl end portion to permit said other pawl end portion to extend therethrough to its engaging position.

27. The clutch of claim 26, wherein said pawl is substantially rigid and said control portion of the control element is resilient to provide yieldable holding of said one pawl end portion with the other pawl end portion extending toward its engaging position and to allow said other pawl end portion to be urged out of its engaging position to permit over-running of said driven member.

28. The clutch of claim 23, wherein said pivot portion is semi-circular in cross-section.

29. The clutch of claim 28, wherein said pivot portion has a non-curvilinear portion adapted to center it on the pocketed member.

30. A two-way over-running clutch applicable to vehicle drive lines comprising a driving member mounted for powered rotation, a driven member mounted for rotation adjacent the driving member in radially inner and radially outer relationship, one of said members having pawl-receiving portions thereon and the other of said members having pawl-holding portions, said pawl-holding portions provided on the radially inner member, first and second pawls interposed between said driving and driven members mounted on said pawl-holding portions for shifting independently of each other between engaging positions extending between said pawl-holding and pawl-receiving portions and non-engaging positions, with said first pawl when in an engaging position being disposed to produce driving engagement between the driving an driven members in one direction, and the second pawl when in an engaging position being disposed to produce driving engagement between the driving and driven members in the opposite direction, and a control element mounted for shifting movement between said driving and driven members operable to control the positions of said pawls, said control element when in a first position holding said first pawl in a non-engaging position and permitting movement of the second pawl to its engaging position, and when in a second position holding said second pawl in a non-engaging position and permitting movement of the first pawl to its engaging position.

31. The clutch of claim 30, which further comprises biasing means yieldably urging a pawl toward its engaging position.

32. The clutch of claim 31, wherein one of said members has a pocket formed therein and a pawl is received in said pocket.

33. The clutch of claim 32, wherein said biasing means is operatively coupled to a pawl to urge one end of said pawl to shift outwardly from said pocket toward the other member.

34. The clutch of claim 31, wherein a pawl when in its engaging position will be positioned to produce driving engagement between the driving and driven member when the driven member rotates no faster than the driving member, but upon rotation of the driven member faster than the driving member said driven member has portions which will act against said pawl to shift the pawl toward its non-engaging position against the urging of the biasing means to permit overrunning by the driven member.

35. The clutch of claim 30, wherein said control element is shiftable to a third position in which both said first and second pawls are permitted to assume their engaging positions to produce driving engagement between the driving and driven members and to prevent over-running of the driving member by the driven member in either direction of rotation.

36. The clutch of claim 30, where in said control element is shiftable to another position in which both said first and second pawls are held in their non-engaging positions.

37. The clutch of claim 30, wherein said control element has a control portion which when positioned over a pawl holds said pawl in its non-engaging position.

38. The clutch of claim 37, wherein said control element has an opening therein, which opening permits a pawl to extend therethrough to its engaging position.

39. The clutch of claim 30, which further comprises operating mechanism operatively connected to said control element to selectively shift said control element between its first and second positions.

40. The clutch of claim 39, wherein said operating mechanism comprises a friction coupling adapted to retard rotation of said control element relative to said driving member upon initiation of rotation of said driving member in one direction.

41. The clutch of claim 30, wherein a pawl is mounted on one of said driving and driven members for pivoting relative thereto and said pawl when in its engaging position is loaded in compression between the pawl-holding and pawl-receiving portions.

42. The clutch of claim 41, wherein the member on which pawl is mounted has a pocket formed in a surface thereof which receives a major portion of said pawl when the pawl is in its non-engaging position.

43. The clutch of claim 42, wherein said control element comprises a plate-like member interposed between said driving and driven members having an opening therein and being shiftable relative to said driving and driven members to selectively expose a pawl to permit it to extend through said opening to its engaging position.

44. The clutch of claim 30, wherein said driving and driven members are substantially cylindrical, concentrically positioned with one surrounding the other, and said pawl-holding and pawl-receiving portions comprise engaging shoulders formed on adjacent facing surfaces of said members.

45. The clutch of claim 30, wherein said driving and driven members comprise rotating plates disposed in face-to-face relation for rotation about a substantially common axis, and said pawl-holding and pawl-receiving portions comprise engaging shoulders formed on adjacent facing surfaces of said members.

46. The clutch of claim 30, wherein said pawl-holding and pawl-receiving portions comprise engaging shoulders formed on adjacent facing surfaces of said driving and driven members, said control element comprises a plate-like member interposed and mounted for shifting between the facing surfaces of the driving and driven members, has a control portion which when positioned over a pawl holds the pawl in its non-engaging position and has an opening therein adapted to be placed in registry with a selected pawl to permit the pawl to extend therethrough to its engaging position.

47. The clutch of claim 30, wherein a pawl has a central pivot portion pivotally mounted in a pocket formed in one of said driving and driven members, and opposed end portions which extend in opposite directions of rotation from said central pivot portion, and the disposition of the control element determines which end portion extends toward the other of said driving and driven members to provide driving connection therebetween.

48. The clutch of claim 47, wherein said end portions extend outwardly from said pivot portion at a shallow angle relative to each other in the direction of the other of said driving and driven members.

49. The clutch of claim 48, wherein said angle between said end portions is in a range of from 140 degrees to 175 degrees.

50. The clutch of claim 47, wherein said control element has a control portion which when positioned over one pawl end portion holds said pawl end portion in its non-engaging position and has an opening therein adapted to be disposed in registry with the other pawl end portion to permit said other pawl end portion to extend therethrough to its engaging position.

51. The clutch of claim 50, wherein said pawl is substantially rigid and said control portion of the control element is resilient to provide yieldable holding of said one pawl end portion with the other pawl end portion extending toward its engaging position and to allow said other pawl end portion to be urged out of its engaging position to permit over-running of said driven member.

52. A two-way overrunning pawl clutch for an automotive drive line comprising:
  a drive member mounted for rotatable movement in first and second directions of rotation;
  a driven member adjacent said drive member and mounted for rotatable movement in said first and second directions of rotation;
  a pawl assembly positioned between said drive and driven members and having first and second positions of engagement;
  said pawl assembly in said first position being in engagement with both the drive and driven members for imparting rotative movement from the drive member to the driven member in the first direction of rotation, said pawl assembly in said second position being in engagement with both the drive and driven members for imparting rotative movement from the drive member to the driven member in the second direction of rotation; and a biasing member biasing the pawl assembly into said first and second positions and a control member including a friction coupling that is responsive to the direction of rotation of the drive member and in cooperation with said biasing member selectively shifting the pawl assembly between the first and second positions.

53. A clutch as defined in claim 52 wherein the pawl assembly is responsive to overrunning of the driven member for disengaging the pawl assembly in either direction of rotation.

54. A clutch member as defined in claim 53 wherein the pawl assembly includes a rocker pawl having a center pivot pivotally seated on the drive member and having oppositely directed pivotal ends for engaging the driven member, said biasing member being a component of the control member and shifted between engagement alternatively with said ends to selectively urge pivoting of one or the other of the pivotal ends into engagement with the driven member.

* * * * *